(12) United States Patent
Zhang et al.

(10) Patent No.: US 10,640,023 B2
(45) Date of Patent: May 5, 2020

(54) SYSTEM AND METHOD OF A THIGH SUPPORT AND A SEAT FOR A VEHICLE

(71) Applicant: GREAT WALL MOTOR COMPANY LIMITED, Hebei (CN)

(72) Inventors: Yawei Zhang, Hebei (CN); Chuanqi Zheng, Hebei (CN); Xu Zhang, Hebei (CN); Pengfei Li, Hebei (CN); Jiashuo Tong, Hebei (CN); Yudong Zhai, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 0 days.

(21) Appl. No.: 16/306,486

(22) PCT Filed: May 27, 2017

(86) PCT No.: PCT/CN2017/086432
§ 371 (c)(1),
(2) Date: Nov. 30, 2018

(87) PCT Pub. No.: WO2017/206848
PCT Pub. Date: Dec. 7, 2017

(65) Prior Publication Data
US 2019/0135149 A1 May 9, 2019

(30) Foreign Application Priority Data

May 31, 2016 (CN) .......................... 2016 1 0375342
May 31, 2016 (CN) ..................... 2016 2 0514036 U

(51) Int. Cl.
*B60N 2/02* (2006.01)
*B60N 2/68* (2006.01)
(Continued)

(52) U.S. Cl.
CPC ............. *B60N 2/62* (2013.01); *B60N 2/0232* (2013.01); *B60N 2/0284* (2013.01); *B60N 2/06* (2013.01);
(Continued)

(58) Field of Classification Search
CPC ... B60N 2/62; B60N 2/66; B60N 2/68; B60N 2/99; B60N 2/0232; B60N 2/0284; B60N 2/2222; B60N 2/06
(Continued)

(56) References Cited

U.S. PATENT DOCUMENTS 7,669,929 B2 * 3/2010 Simon .................. B60N 2/0224
297/284.11
9,016,785 B2 * 4/2015 Freisleben ........... B60N 2/0232
297/284.11
(Continued)

FOREIGN PATENT DOCUMENTS

CN 201501321 U 6/2010
CN 102822015 A 12/2012
(Continued)

OTHER PUBLICATIONS

International Search Report with English translation issued in PCT/CN20171086432 dated Aug. 24, 2017 (8 pages).
(Continued)

*Primary Examiner* — Rodney B White
(74) *Attorney, Agent, or Firm* — Osha Liang LLP

(57) ABSTRACT

A thigh support, a seat and a vehicle are provided. The thigh support includes a thigh-support fixing portion, a thigh-support moving portion, a thigh-support driving portion, and a thigh-support bracing portion disposed to the thigh-support fixing portion and located at a rear side of the thigh-support moving portion, in which the rear edge of the thigh-support moving portion is provided with a rear edge
(Continued)

recessed portion recessed forwards, a front edge of the thigh-support bracing portion is formed with a front edge protruding portion protruding forwards, and the front edge protruding portion matches the rear edge recessed portion in shape. The seat and the vehicle have the above thigh support.

20 Claims, 10 Drawing Sheets

(51) Int. Cl.
  *B60N 2/62* (2006.01)
  *B60N 2/06* (2006.01)
  *B60N 2/90* (2018.01)
  *B60N 2/22* (2006.01)
  *B60N 2/66* (2006.01)
(52) U.S. Cl.
  CPC ............ *B60N 2/2222* (2013.01); *B60N 2/66* (2013.01); *B60N 2/68* (2013.01); *B60N 2/99* (2018.02)
(58) Field of Classification Search
  USPC ...................................................... 297/284.11
  See application file for complete search history.

(56) References Cited

U.S. PATENT DOCUMENTS

| | | | |
|---|---|---|---|
| 2009/0085387 A1* | 4/2009 | Thiel .................... | B60N 2/0284 297/284.11 |
| 2015/0258914 A1* | 9/2015 | Lee ......................... | B60N 2/62 297/284.11 |
| 2017/0267141 A1* | 9/2017 | Line ......................... | B60N 2/62 |
| 2017/0291520 A1* | 10/2017 | Line ......................... | B29C 43/18 |
| 2017/0291522 A1* | 10/2017 | Line ......................... | B60N 2/62 |
| 2017/0291523 A1* | 10/2017 | Line ..................... | B60N 2/0232 |
| 2018/0065529 A1* | 3/2018 | Line ....................... | B60N 2/682 |
| 2018/0099595 A1* | 4/2018 | Kondrad ................ | B60N 2/929 |

FOREIGN PATENT DOCUMENTS

| | | |
|---|---|---|
| CN | 103738205 A | 4/2014 |
| CN | 104015644 A | 9/2014 |
| CN | 204488551 U | 7/2015 |
| CN | 204547862 U | 8/2015 |
| CN | 205768849 U | 12/2016 |
| CN | 205768851 U | 12/2016 |
| CN | 205930400 U | 2/2017 |
| CN | 205930401 U | 2/2017 |
| DE | 19726680 A1 | 1/1999 |
| DE | 102006045387 A1 | 10/2007 |
| DE | 102010039027 A1 | 2/2012 |

OTHER PUBLICATIONS

Written Opinion of the International Search Authority with English translation issued in PCT/CN2017/086432 dated Aug. 24, 2017 (13 pages).

Extended European Search Report issued in corresponding European Application No. 17805793.1, dated Jan. 29, 2020 (9 pages).

* cited by examiner

SYSTEM AND METHOD OF A THIGH SUPPORT AND A SEAT FOR A VEHICLE

CROSS-REFERENCE TO RELATED APPLICATION

The present application is a national phase entry under 35 USC § 371 of International Application PCT/CN2017/086432, filed May 27, 2017, which claims the benefit of and priority to Chinese Patent Application No. 201610375342.0 filed May 31, 2016 and No. 201620514016.6 filed May 31, 2016, the entire disclosure of which are incorporated herein by reference.

FIELD

Embodiments disclosed herein relate to an apparatus, system, and method for a vehicle. More particularly, embodiments disclosed herein relate to a thigh support and a seat for use in a vehicle.

BACKGROUND

A seat frame of a passenger vehicle currently on the market can only meet a mace requirement of people with different body sizes, but cannot meet a riding comfort requirement thereof. Moreover, the seat frame cannot perform an interchange or upgrade in function, and a partial structure of the seat flame product needs to be redeveloped, resulting in a complicated seat frame structure, cumbersome manufacturing process, high weight, and high development cost.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a thigh support having a thigh-support fixing portion a thigh-support moving portion, a thigh-support guiding portion being provided between the thigh-support moving portion and the thigh-support fixing portion, the thigh-support moving portion being able to move forwards and backwards relative to the thigh-support fixing portion under guidance of the thigh-support guiding portion, and the thigh-support moving portion having a forward limit position where it moves forward to a limit position; a thigh-support driving portion configured to drive the thigh-support moving portion to move forwards and backwards; and a thigh-support bracing portion disposed to the thigh-support fixing portion and located at a rear side of the thigh-support moving portion, a part of the thigh-support bracing portion being flush with a rear edge of the thigh-support moving portion in the forward limit position, or a part of the thigh-support bracing portion being located in front of the rear edge of the thigh-support moving portion in the forward limit position, in which the rear edge of the thigh-support moving portion is provided, with a rear edge recessed portion recessed forwards, a front edge of the thigh-support bracing portion is formed with a front edge protruding portion protruding forwards, and the front edge protruding portion matches the rear edge recessed portion in shape.

Further, an upper surface of the thigh-support bracing portion is flush with an upper surface of the thigh-support moving portion.

Further, when the thigh-support moving portion is in an initial position, the front edge protruding portion is embedded in the rear edge recessed portion, and the front edge of the thigh-support bracing, portion abuts the rear edge of the thigh-support moving portion; when the thigh-support moving portion is in the forward limit position, the rear edge of the thigh-support moving portion is spaced apart from the front edge of the thigh-support bracing portion in the front-rear direction, and the front edge of the front edge protruding portion is flush with or located in front of the rear edge of the thigh-support moving portion.

Further, the thigh-support bracing portion is configured as a support flat plate, and the front edge protruding portion is a trapezoidal plate integrally formed on a front edge of the support flat plate.

Further, the front edge protruding portion is located in a middle of the thigh-support bracing portion in a left-right direction.

Further, the thigh support bracing portion is configured as a rollable retractable sheet having a fixed end and a moving end, the moving end of the retractable sheet is secured to the rear edge of the thigh-support moving portion, such that the thigh-support moving portion stretches the retractable sheet forwards by pulling the moving end of the retractable sheet when the thigh-support moving portion moves forwards.

Further, the thigh-support bracing portion is configured as a pleated plate having, a plurality of pleated structures, the pleated plate has a fixed end and a moving end, and the moving end of the pleated plate is secured to the rear edge of the thigh-support moving portion, such that the thigh-support moving portion flattens the pleated plate by pulling the moving end of the pleated plate when the thigh-support moving portion moves forwards.

Further, the thigh support also includes an elastic thigh-support bracing portion that is adapted to be elastically supported at a bottom of the stretched retractable sheet.

Further, the thigh support also includes an elastic thigh-support bracing portion that is adapted to be elastically supported at a bottom of the flattened pleated plate.

Further, the thigh support also includes two groups of thigh-support linkage structures spaced in a left-right direction. The thigh-support linkage structure includes a thigh-support fixing portion connecting rod and a thigh-support moving portion connecting rod; an end of the thigh-support moving portion connecting rod is connected with the thigh-support moving portion, and the other end of the thigh-support moving portion connecting rod is pivotally connected with the thigh support fixing portion connecting rod; an end of the thigh-support fixing portion connecting rod is pivotally connected with the thigh-support fixing portion, and a synchronizing rod is provided between the other end of the thigh-support fixing portion connecting rod in the left and the other end of the thigh-support fixing portion connecting rod in the right, in which a lower end of the seat cover of the seat is secured to the synchronizing rod.

In another aspect, embodiments disclosed herein relate to a seat having a seat frame and at least one electrically actuated function module. The seat frame includes a backrest frame, a seat-cushion seat-basin assembly. The backrest frame includes: an upper horizontal plate, a side panel disposed at each of left and right ends of the upper horizontal plate, and a lower horizontal plate connected between bottoms of two side panels. The seat-cushion seat-basin assembly includes: a seat cushion including seat-cushion side panels spaced apart in a left-right direction, a front linkage rod and a rear linkage rod being provided between two seat-cushion side panels and spaced apart in a front-rear direction, two ends of each linkage rod being provided with a connecting rod separately, and the connecting rod being adapted to be pivotally connected with a sliding rail; and a seat basin disposed at a flout side of the seat cushion. The at least one electrically actuated function module is disposed to the backrest frame or the seat-cushion seat-basin assembly, and includes a shoulder adjustment mechanism, a backrest flank, a backrest-frame reclining mechanism, a seat-basin height-adjustment motor, a seat-basin flank, a seat-basin tilt adjustment motor, and a thigh support.

Further, the side panel is provided with a side-panel upper recess and a side-panel lower recess that are spaced apart in an up-down direction, and the side-panel upper recess has a length smaller than a length of the side-panel lower recess.

Further, an upper end of the side-panel lower recess is close to an upper end of the side panel, while a lower end of the side-panel lower recess is close to a lower end of the side panel; a distance between a front edge of the side-panel lower recess and a front edge of the side panel is denoted as D1, a distance between a rear edge of the side-panel lower recess and a rear edge of the side panel is denoted as D2, and D1 and D2 satisfy: 10 mm ≤ D1 ≤ 15 mm, and 10 mm ≤ D2 ≤ 15 mm, respectively.

Further, the lower horizontal plate is located in front of and below the upper horizontal plate; the side panel is divided into a side-panel upper segment, a side-panel middle segment, and a side-panel lower segment; the side-panel upper segment is connected with the upper horizontal plate, the side-panel lower segment is connected with the lower horizontal plate, and the side-panel middle segment is connected between the side-panel upper segment and the side-panel lower segment in a forwardly curved manner; and a vertical height ratio of the side-panel upper segment, the side-panel middle segment and the side-panel lower segment is 1:4:2.

Further, the shoulder adjustment mechanism includes: a shoulder frame including a shoulder frame rotating portion, the shoulder frame rotating portion being pivotally mounted to the backrest frame of the seat and being provided with a lumbar-support mounting hole for mounting a lumbar support; and a shoulder-frame electrical driving part configured to drive the shoulder frame to rotate around the shoulder frame rotating portion.

Further, the seat further includes a driving-force balancing device disposed between the shoulder-frame electrical driving part and the shoulder frame, the driving-force balancing device having a plurality of driving-force balancing device connecting portions connected with the shoulder frame. The driving-force balancing device includes a shared connecting rod and a plurality of branch connecting rods, the shared connecting rod being connected with the shoulder-frame electrical driving part, and each branch connecting rod having a first end connected with the shared connecting rod and a second end connected with the shoulder frame.

Further, the seat further includes a memory module and an identification module, the identification module being connected with the memory module and the shoulder-frame electrical driving part.

Further, the backrest flank includes a left backrest flank and a right backrest flank. Each of the left backrest flank and the right backrest flank includes: a backrest flank fixing portion adapted to be secured to the backrest frame of the seat; a backrest flank rotating portion rotatably mounted to the backrest flank fixing portion; and a backrest flank airbag sandwiched between the backrest flank fixing portion and the backrest flank rotating portion and configured to be able to be inflated or deflated.

Further, the backrest flank airbag of the left backrest flank and the backrest flank airbag of the right backrest flank are configured to be inflated or deflated synchronously; or each backrest flank airbag is inflated and deflated alternately.

Compared with the related art, the seat of the present disclosure has the following advantages.

For the seat according to the present disclosure, by providing the backrest frame and the seat-cushion seat-basin assembly, the seat frame can have a simple structure and light weight to satisfy the lightweight requirement of the vehicle; additionally, the seat frame has better universality, such that the seat can realize various adjustment functions, thereby satisfying different needs of the driver for the vehicle seat.

In another aspect, embodiments disclosed herein relate to a vehicle is provided with the above seat. The vehicle has the same advantages as the above seat with respect to the related art, which will not be elaborated herein.

Other aspects and advantages will be apparent from the following description and the appended claims.

BRIEF DESCRIPTION OF THE DRAWINGS

Drawings constituting a part of the present disclosure provide a further understanding of the present disclosure, and exemplary embodiments of the present disclosure and the description thereof are used to explain the present disclosure and do not constitute an undue limitation on the present disclosure.

REFERENCE NUMERALS

Figure 1:
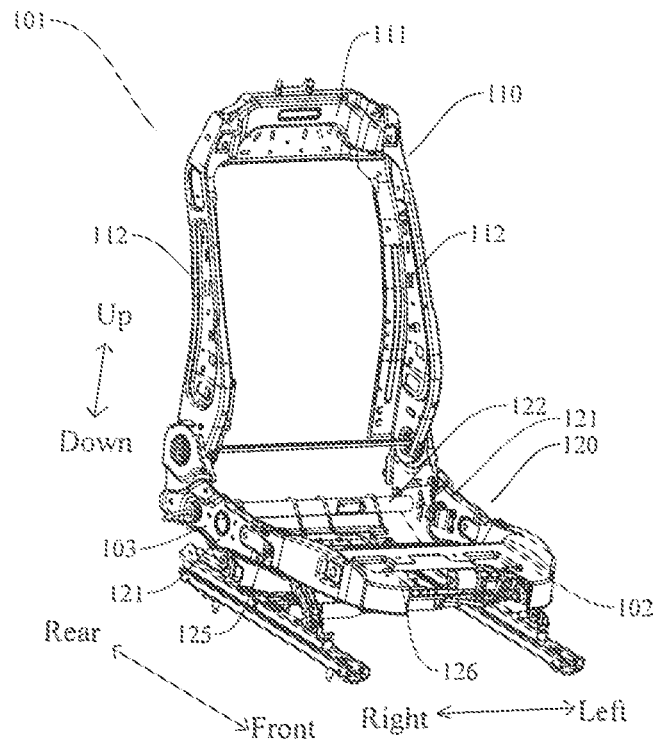
FIG. 1 is a schematic view of a seat frame of a seat according to an embodiment of the present disclosure.

Seat frame 101, seat basin 102, seat cushion 103, front linkage rod 104, seat-basin oblong slot 105, backrest frame 110, upper horizontal plate 111, side panel 112, lower horizontal plate 113, side-panel upper recess 114, side-panel lower recess 115, side-panel upper segment 116, side-panel middle segment 117, side-panel lower segment 118, side-panel flanged edge 119, seat-cushion seat-basin assembly 120, seat-cushion side panel 121, rear linkage rod 122, connecting rod 123, seat-basin rotation hole 124, seat-basin rotation center 125, thigh-support mounting space 126, thigh-support mounting portion 127, seat-basin front reinforcing structure 128, seat spring mounting point 129, shoulder-adjustment-mechanism motor mounting portion 131, shoulder-adjustment-mechanism rotating-shaft mounting portion 132, backrest-flank mounting portion 133, backrest-frame recliner mounting portion 134, seat-basin height adjustment mechanism mounting portion 135, seat-basin tilt adjustment mechanism mounting portion 137, fan-shaped height-adjustment gear 139, height-adjustment limiting slot 140, backrest-frame recliner 141, backrest-frame recliner drive motor 142, backrest-frame mounting plate 143;

Seat-basin tilt adjustment mechanism 201, seat-basin tilt adjustment bracket 202, first connecting end 203, second connecting end 204, seat-basin tilt adjustment motor 205, seat-basin tilt adjustment lead screw 207, seat-basin tilt adjustment mechanism mounting sub-portion 208, driven tilt adjustment bracket 209;

Thigh support 301, thigh-support fixing portion 302, thigh-support moving portion 303, thigh-support guiding portion 304, thigh-support driving portion 305, thigh-support bracing portion 306, rear edge recessed portion 307, front edge protruding portion 308, elastic thigh-support bracing portion 309, thigh-support linkage structure 310, thigh-support fixing portion connecting rod 311, thigh-support moving portion connecting rod 312, synchronizing rod 313;

Sliding rail bracket 401, left sliding rail 402, right sliding rail 403, first left front bracket 404, first left rear bracket 405, first right front bracket 406, first right rear bracket 407, bracket protruding portion 408, reinforcing structure 409, connecting-rod connecting hole 410, safety belt fixing hole 411, vertical plate 412, connecting baseplate 413, connecting flanged edge 414;

Lumbar support 501, lumbar-support fixing portion 502, lumbar-support airbag 503, ventilation-device clearance hole 504, ventilation device 505, fan 506, air channel 507, ventilation sponge 508;

Shoulder adjustment mechanism 601, shoulder frame 602, shoulder frame rotating portion 603, lumbar-support mounting hole 604, shoulder-frame electrical driving part 605, driving-force balancing device 606, driving-force balancing device connecting portion 607, shared connecting rod 608 branch connecting rod 609, shoulder eras vertical plate 610, shoulder-frame horizontal connecting plate 611;

Backrest flank 801, left backrest flank 802, right backrest flank 803, backrest flank fixing portion 804, backrest flank rotating portion 805, backrest flank airbag 806, air power source 807, inflating pump 808, air valve 809, backrest flank rotating shaft 810;

Seat-basin flank 901, seat-basin flank fixing plate 902, seat-basin flank airbag, 903, seat-basin flank snap 904, seat-basin flank snap body 905, seat-basin flank snap elastic arm 906, seat-basin flank protruding portion 907, seat-basin flank airbag fixing plate 908.

DETAILED DESCRIPTION

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description. It should be noted that embodiments in the present disclosure and features in the embodiments may be combined with each other without conflict.

A seat according to the embodiments of the present disclosure will be described in detail below with reference to the accompanying drawings. The seat includes a seat frame 101 and at least one electrically actuated function module.

The seat frame 101 according to the embodiments of the present disclosure can include a backrest frame 110 and a seat-cushion seat-basin assembly 120. The backrest frame 110 extends substantially along a vertical direction, the seat-cushion seat-basin assembly 120 extends substantially along a front-rear direction, and the backrest frame 110 is mounted at a rear side of the seat-cushion seat-basin assembly 120.

Figure 2:
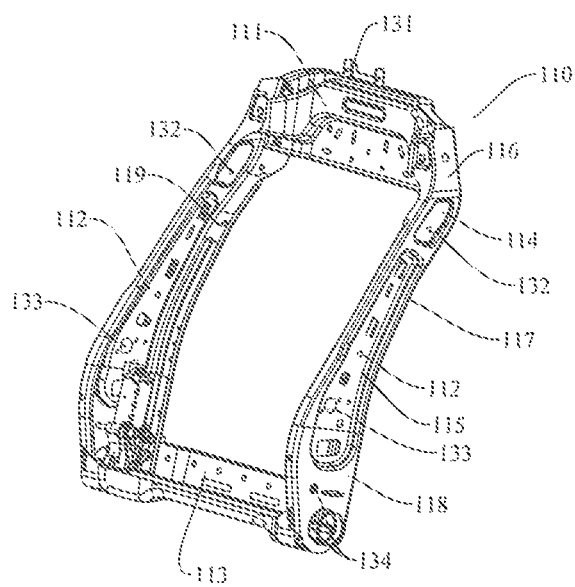
FIG. 2 is a schematic view of a backrest frame of the seat frame in FIG. 1.

As illustrated in FIGS. 1 and 2, the backrest frame 110 includes an upper horizontal plate 111, two side panels 112, and a lower horizontal plate 113. The two side panels 112 are connected at left and right ends of the upper horizontal plate 111, respectively. The lower horizontal plate 113 is connected between bottoms of the two side panels 112. Thus, the backrest frame 110 can have a simple structure and light weight, and hence the seat frame 101 can satisfy a light-weight requirement of a vehicle.

Figure 3:
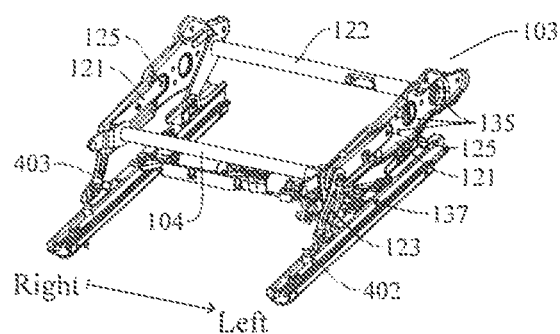
FIG. 3 is a schematic view of a seat cushion of the seat frame in FIG. 1.
Figure 4:
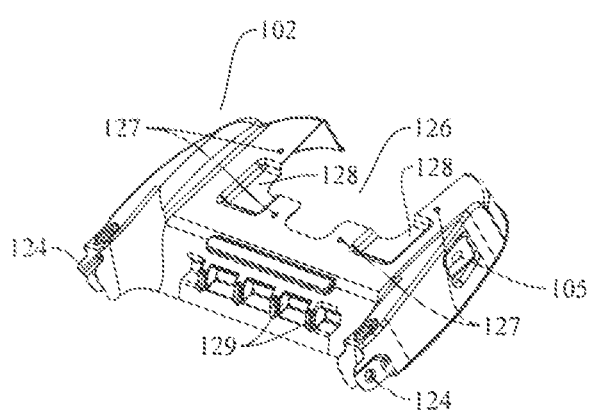
FIG. 4 is a schematic view of a seat basin of the seat frame in FIG. 1.

Referring to FIGS. 1, 3 and 4 together, the seat-cushion seat-basin assembly 120 can include seat cushion 103 and a seat basin 102. The seat cushion 103 includes seat-cushion side panels 121 spaced apart in a left-right direction. Between two seat-cushion side panels 121 provided are a front linkage rod 104 and a rear linkage rod 122, and two ends of each linkage rod are provided with a connecting rod 123 separately. The connecting rod 123 is adapted to be pivotally connected with a sliding rail. The seat basin 102 is disposed at a front side of the seat cushion 103. In other words, the front linkage rod 104 and the rear linkage rod 122 are connected between the two seat-cushion side panels 121, and the front linkage rod 104 and the rear linkage rod 122 are able to rotate with respect to the two seat-cushion side panels 121. The connecting rod 123 is connected between the linkage rod and the sliding rail, and when the connecting rod 123 is rotated relative to the sliding rail, the height of the seat-cushion seat-basin assembly 120 can be adjusted, such that it is convenient for a driver to adjust the seat-cushion seat-basin assembly 120 to a desired height. Thus, the seat-cushion seat-basin assembly 120 has a simple structure and light weight, and hence the seat frame 101 can satisfy the lightweight requirement of the vehicle.

The seat frame 101 is provided with at least one of a shoulder-adjustment-mechanism motor mounting portion 131, a shoulder-adjustment-mechanism rotating-shaft mounting portion 132, a backrest flank mounting portion 133, a backrest-frame recliner mounting portion 134, a seat-basin height adjustment mechanism mounting portion 135, a seat-basin flank mounting portion, a seat-basin tilt adjustment mechanism mounting portion 137, and a thigh-support mounting portion 127. The electrically actuated function module is provided to the backrest frame 110 or the seat-cushion seat-basin assembly 120, and one of a plurality of electrically actuated function modules corresponds to one of the various mounting portions mentioned above. The function module includes a shoulder adjustment mechanism 601, a backrest flank 801, a backrest-frame reclining mechanism, a seat-basin height-adjustment motor, a seat-basin flank 901, a seat-basin tilt adjustment motor 205, and a thigh support 301.

The shoulder-adjustment-mechanism motor mounting portion 131 can be used to mount a motor of the shoulder adjustment mechanism 601 (i.e. a motor in a shoulder-frame electrical driving part 605) to the backrest frame 110, and the shoulder-adjustment-mechanism rotating-shaft mounting portion 132 can be used to mount a shoulder frame rotating portion 603 to the backrest frame 110, such that the shoulder adjustment mechanism 601 is mounted to the backrest frame 110 by means of the shoulder-adjustment-mechanism motor mounting portion 131 and the shoulder-adjustment-mechanism rotating-shaft mounting portion 132.

The backrest flank mounting portion 133 can mount the backrest flank 801 to the backrest frame 110. The backrest-frame reclining mechanism can include a backrest-frame recliner 141, and a backrest-frame recliner drive motor 142. The backrest-frame recliner mounting portion 134 can be used to mount the backrest-frame recliner 141 and the backrest-frame recliner drive motor 142 to the backrest frame 110. The seat-basin height adjustment mechanism mounting portion 135 can mount a seat-basin height adjustment mechanism to the seat cushion 103. The seat-basin flank mounting portion can be used to mount the seat-basin flank 901 to the seat basin 102. The seat-basin tilt adjustment mechanism mounting portion 137 can be used to mount the seat-basin tilt adjustment motor 205 of a seat-basin tilt adjustment mechanism 201 to the front linkage rod 104 of the seat cushion 103. The thigh-support mounting portion 127 can be used to mount the thigh support 301 to the seat basin 102. Thus, the seat frame 101 has better universality, and can select a mounting portion for a corresponding function according to actual situations of the seat and the vehicle, to mount a corresponding functional module to the seat frame 101, thereby achieving more seat types to match various adjustment functions to meet different requirements of the driver for the vehicle seat.

In some embodiments, the various mounting portions mentioned above are mounted in corresponding positions of the seat frame 101. The installation location of each mounting portion, and the function and working principle of the functional module installed by each mounting portion will be described in detail in the following.

By providing the backrest flame 110 and the seat-cushion seat-basin assembly 120, the seat frame 101 according to embodiments of the present disclosure can have the simple structure and light weight, so as to meet a lightweight requirement of the vehicle, and moreover, the seat frame 101 has better universality, the seat can realize various functions to satisfy different needs of the driver for the vehicle seat.

A specific structure of the backrest frame 110 in the seat frame 101 according to embodiments of the present disclosure will be described below in detail.

Figure 5:
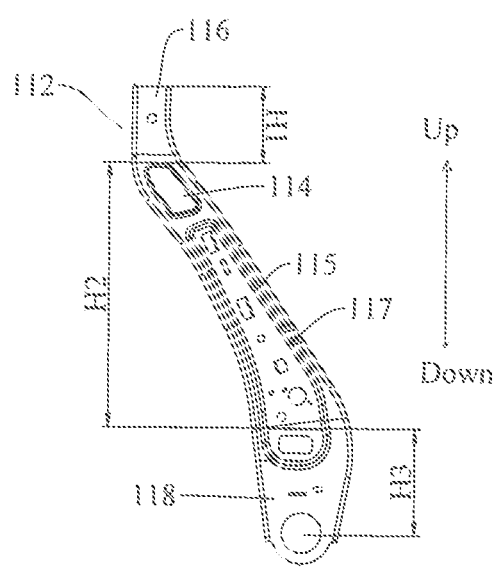
FIG. 5 is a schematic view of a side panel of the backrest frame in FIG. 2.

As illustrated in FIG. 2, the shoulder-adjustment-mechanism motor mounting portion 131 can be provided at an upper end of the upper horizontal plate 111 of the backrest frame 110, and the motor in the shoulder-frame electrical driving part 605 is mounted to the shoulder-adjustment-mechanism motor mounting portion 131. As illustrated in FIGS. 2 and 5, the side panel 112 can be provided with a side-panel upper recess 114 and a side-panel lower recess 115, and the side-panel upper recess 114 and the side-panel lower recess 115 are spaced apart in an up-down direction. The side-panel upper recess 114 and the side-panel lower recess 115 are recessed inwards, that is, the side-panel upper recess 114 and the side-panel lower recess 115 located on the right side panel 112 are recessed towards a left side. By providing the side-panel upper recess 114 and the side-panel lower recess 115, the structural strength of the side panel 112 can be reinforced at least to a certain extent, thereby enhancing, the structural strength of the backrest frame 110, so as to improve the structural strength of the seat frame 101. Moreover, the side-panel upper recess 114 and the side-panel lower recess 115 can be provided with corresponding mounting portions, thereby arranging the mounting portions reasonably and reliably.

In one or more embodiments, as illustrated in FIG. 2, the side-panel upper recess 114 can have a length smaller than a length of the side-panel lower recess 115. As illustrated in FIG. 2, the side-panel upper recess 114 is internally provided with the shoulder-adjustment-mechanism rotating-shaft mounting portion 132, and the shoulder-adjustment-mechanism rotating-shaft mounting portion 132 can be a hole-like structure. The side-panel lower recess 115 can be internally provided with the backrest flank mounting portion 133, and the backrest flank mounting portion 133 can be constructed as a hole-like structure. Thus, the side-panel upper recess 114 and the side-panel lower recess 115 can enhance the structural strength of the side panel 112 in a length direction of the side panel 112, and the side-panel upper recess 114 and the side-panel lower recess 115 can be provided with different mounting portions to ensure the reliable arrangement of the mounting portions on the side panel 112.

In some embodiments, the side-panel upper recess 114 can have a depth smaller than a depth of the side-panel lower recess 115. Thus, the side-panel upper recess 114 and the side-panel lower recess 115 can reduce the influence on the structural strength of the side panel 112 at least to a certain extent, and moreover, the side-panel upper recess 114 can facilitate the installation of the shoulder-adjustment-mechanism rotating-shaft mounting portion 132 while the side-panel lower recess 115 can facilitate the installation of the backrest flank mounting portion 133.

In one or more embodiments, as illustrated in FIGS. 2 and 5, the side-panel upper recess 114 can be a structure with a constant width, while the side-panel lower recess 115 has a width increased gradually from up to down. Thus, the side-panel upper recess 114 can have the same reinforcing effect on a front side wall and a rear side wall of the side panel 112 in the up-down direction; additionally, since a portion of the side panel 112 corresponding to the side-panel lower recess 115 has a tendency to increase in width from up to down, the side-panel lower recess 115 can have the same reinforcing effect on the front side wall and the rear side wall of the side panel 112 by configuring the side-panel lower recess 115 to have the gradually increased width from up to down, so as to ensure the structural reliability of the side panel 112.

In some embodiments, as illustrated in FIG. 2, a front edge and a rear edge of the side panel 112 are each provided with a side-panel flanged edge 119, and the side-panel flanged edge 119 extends toward an interior of the backrest frame 110, and extends upwards and downwards, respectively, to upper and lower ends of the side panel 112. The side-panel flanged edge 119 and the side panel 112 can be an integrally formed structure, and by configuring the side-panel flanged edge 119 to extend upwards to the upper end of the side panel 112 and extend downwards to the lower end of the side panel 112, the side-panel flanged edge 119 can enhance the structural strength of the side panel 112 effectively in the up-down direction, so as to reinforce the structural strength of the backrest frame 110 effectively. An upper end of the side-panel flanged edge 119 can be fixedly connected to the upper horizontal plate 111, while a lower end of the side-panel flanged edge 119 can be fixedly connected to the lower horizontal plate 113.

An upper end of the side-panel lower recess 115 is close to the upper end of the side panel 112, while a lower end of the side-panel lower recess 115 is close to the lower end of the side panel 112. A distance between a front edge of the side-panel lower recess 115 and the front edge of the side panel 112 is denoted as D1, and a distance between a rear edge of the side-panel lower recess 115 and the rear edge of the side panel 112 is denoted as D2, in which D1 and D2 satisfy: 10 mm ⩽ D1 ⩽ 15 mm, and 10 mm ⩽ D2 ⩽ 15 mm. The side panel 112 within the above range has better structural strength and satisfies the lightweight requirement of the vehicle. Preferably, D1 and D2 can further satisfy: D1-D2.

According to one or more embodiments of the present disclosure, as illustrated in FIG. 5, the lower horizontal plate 113 is located in front of and below the upper horizontal plate 111; the side panel 112 is divided into a side-panel upper segment 116, a side-panel middle segment 117, and a side-panel lower segment 118; the side-panel upper segment 116 is connected with the upper horizontal plate 111, the side-panel lower segment 118 is connected with the lower horizontal plate 113, and the side-panel middle segment 117 is connected, in a forwardly curved manner, between the side-panel upper segment 116 and the side-panel lower segment 118. Thus, the side panel 112 can be substantially S-shaped, and the side-panel middle segment 117 can make the side panel 112 smooth in profile, such that the seat can be designed more ergonomically; thereby improving driving comfort for the driver. In addition, the forwardly curved side-panel middle segment 117 can guarantee the structural reliability of the side panel 112.

Figure 8:
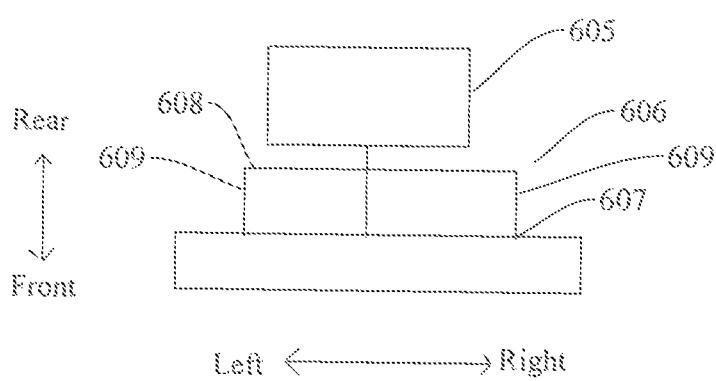
FIG. 8 is a schematic view of a driving-force balancing device of the shoulder adjustment mechanism in FIG. 7.

In one or more embodiments, as illustrated in FIG. 8, a vertical height ratio of the side-panel upper segment 116, the side-panel middle segment 117 and the side-panel lower segment 118 may be 1:4:2. The side panel 112 that satisfies the above ratio has a reliable structure, and the height of each segment is reasonably set, such that the side panel 112 can have a better profile to ensure the comfort of the driver sitting on the seat.

Further, as illustrated in FIG. 5, the side-panel upper recess 114 and a part of the side-panel lower recess 115 are located at the side-panel middle segment 117, and the remaining part of the side-panel lower recess 115 is located at the side-panel lower segment 118, in which a vertical height of the remaining part of the side-panel lower recess 115 does not exceed one third of a vertical height of the part of the side-panel lower recess 115. Thus, the side-panel lower recess 115 that satisfies the above relationship is arranged reasonably, which can ensure the structural strength of the side panel 112 while the side panel 112 can be made lighter in weight, and thus can enable the backrest frame 110 to meet the lightweight requirement of the vehicle.

As illustrated in FIGS. 2 and 5, the backrest flank mounting portion 133 can be located at the side-panel middle segment 117 and situated in the side-panel lower recess 115, the shoulder-adjustment-mechanism rotating-shaft mounting portion 132 is located in the side-panel upper recess 114, the backrest-frame recliner mounting portion 134 is located at the side-panel lower segment 118, and the backrest-frame recliner is situated below the side-panel love, recess 115. The backrest-frame recliner mounting portion 134 can be two mounting holes, one of which is used to mount the backrest-frame recliner, while the other of which can be used to mount a motor for driving the backrest-frame recliner. Hence, a plurality of mounting portions can be distributed on the side panel 112 and arranged on the side panel 112 reasonably, such that the versatility of the seat frame 101 can be improved, and the seat can perform various functions to meet the driver's requirement for the seat function.

The seat-cushion seat-basin assembly 120 of the seat frame 101 according to embodiments of the present disclosure will be described below with reference to the drawings. Referring to FIGS. 3 and 4 together, the seat basin 102 is provided with a seat-basin rotation hole 124, the seat-cushion side panel 121 is provided with a seat-basin rotation center 125, and the seat-basin rotation hole 124 and the seat-basin rotation center 125 are rotatably connected. A pivoting member passes through the seat-basin rotation hole 124 and the seat-basin rotation center 125, so that the seat basin 102 can be rotated with a connection line of two seat-basin rotation centers 125 as a central axis, thereby realizing an tilt adjustment function of the seat basin 102.

In some embodiments, the seat-basin rotation hole 124 can be located at a rear portion of each of left and right sides of the seat basin 102, and a seat-basin oblong slot 105 is provided at a front portion of each of the left and right sides of the seat basin 102. The seat-basin oblong slot 105 can be used to be connected with the seat-basin tilt adjustment mechanism 201, such that the seat-basin tilt adjustment mechanism 201 can perform the tilt adjustment by driving the seat basin 102 around the seat-basin rotation center 125 through the seat-basin oblong slot 105. The connection relationship between the seat-basin oblong slot 105 and the seat-basin tilt adjustment mechanism 201 will be described in detail later.

In one or more embodiments, as illustrated in FIG. 4, a middle front portion of the seat basin 102 may define a thigh-support mounting space 126. The thigh-support mounting space 126 can be used to mount the thigh support 301. Optionally as illustrated in FIG. 4, an upper surface of the seat basin 102 can be provided with a plurality of thigh-support mounting portions 127 surrounding the thigh-support mounting space 126. The thigh-support mounting portion 127 can be configured as a mounting hole, and a plurality of mounting holes can be arranged around the thigh-support mounting space 126. Specifically, as illustrated in FIG. 4, there are four thigh-support mounting portions 127 in total, two thigh support mounting portions 127 being provided at a rear side of the thigh support mounting space 126 and spaced apart in the left-right direction, while the other two thigh-support mounting portions 127 being provided at a left side and a right side of the thigh-support mounting space 126 and arranged symmetrically with respect to the thigh-support mounting space 126. By providing the plurality of thigh-support mounting portions 127, the thigh support 301 can be firmly secured in the thigh-support mounting space 126, thereby ensuring the installation reliability between the thigh support 301 and the seat basin 102.

Further, as illustrated in FIG. 4, the upper surface of the seat basin 102 shear the thigh-support mounting portion 127 is stamped with a seat-basin front reinforcing structure 128. The seat-basin front reinforcing structure 128 can be configured as a groove structure, and by providing the seat-basin front reinforcing, structure 128, it is possible to reinforce the structural strength of the seat basin 102 effectively, and enhance the installation strength between the seat basin 102 and the thigh support 301. Referring to FIGS. 1 and 4 together, a rear portion of the seat basin 102 is provided with a seat spring mounting point 129, and a seat-basin rear-portion reinforcing structure is provided near the seat spring mounting point 129. A seat spring is connected between the rear linkage rod 122 of the seat cushion 103 and the seat spring mounting point 129 of the seat basin 102, and by providing the seat-basin rear-portion reinforcing structure, it is possible to reinforce the structural strength of the rear portion of the seat basin 102 effectively, and enhance the structural strength of the seat spring mounting point 129, thereby improving the structural reliability of the seat-cushion seat-basin assembly 120 and the structural reliability of the seat frame 101.

In some embodiments, the seat spring mounting point 129 and the seat-basin rear-portion reinforcing structure are arranged alternately in the left-right direction, and the seat-basin front reinforcing structure 128 and the seat-basin rear-portion reinforcing structure are formed by stamping the seat basin 102. Thus, the seat-basin rear-portion reinforcing structure can be provided between two seat spring mounting points 129 or provided in a position adjacent to the seat spring mounting point 129 located at an outer side, such that the seat-basin rear-portion reinforcing structure can enhance the structure strength of the seat spring mounting point 129 better and improve the structural strength of the seat frame 101.

In one or more embodiments, as illustrated in FIG. 4, the rear portions of the left and right sides of the seat basin 102 are formed with a clamping slot correspondingly to clamp the seat-cushion side panel 121, and an outer wall of the clamping slot is provided with the seat-basin rotation hole 124. It could be understood that the seat-basin rotation center 125 can be fitted with the seat-basin rotation hole 124 conveniently by providing the clamping slot, and hence the installation efficiency of the seat frame 101 can be improved, and the fitting reliability of the seat-basin rotation center 125 and the seat-basin rotation hole 124 can be enhanced.

In one or more embodiments, as illustrated in FIG. 3, the seat-cushion side panel 121 can exhibit a multi-stepped shape, a distance between the two seat-cushion side panels 121 is gradually decreased from the rear to the front, and upper and lower edges of the seat-cushion side panel 121 are provided with the seat-cushion flanged edge 119 correspondingly. It could be understood that by configuring the seat-cushion side panel 121 in the stepped structure, the structural strength of the seat-cushion side panel 121 can be improved effectively, the structural strength of the seat cushion 103 can be improved, and hence the structural strength of the seat frame 101 can be improved. In addition, it is possible to improve the structural strength of the seat-cushion side panel 121, the structural strength of the seat cushion 103, and thus the structural strength of the seat frame 101 effectively, by providing the seat-cushion flanged edge 119.

Figure 6:
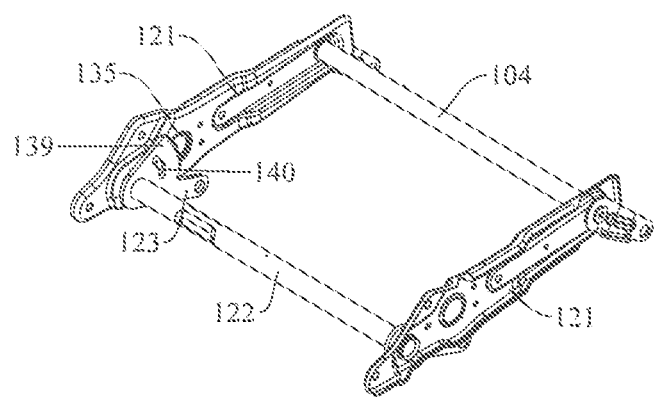
FIG. 6 is a schematic view of a seat cushion of the seat frame in FIG. 1.

According to one or more embodiments of the present disclosure, one connecting rod 123 is provided with a fan-shaped height-adjustment gear 139 to constitute a driving connecting rod, while the remaining three connecting rods 123 are driven connecting rods. As illustrated in FIG. 1, the connecting rod 123 at a left roar side can constitute the driving connecting rod, while the remaining three connecting rods 123 are driven connecting rods. As illustrated in FIG. 6, the seat-basin height adjustment mechanism can include the seat-basin height-adjustment motor and the fan-shaped height-adjustment gear 139 which is mounted to the rear linkage rod 122, the seat-basin height-adjustment motor drives the fan-shaped height-adjustment gear 139 to rotate with an axis of the rear linkage rod 122 as a pivot axis, and the fan-shaped height-adjustment gear 139 is linked with the driving connecting rod, and preferably; is integrally formed with the driving connecting rod, such that the driving connecting rod can be rotated with a connection point between the driving connecting rod and the sliding rail as a rotation center under the driving of the seat-basin height-adjustment motor, thereby realizing the height adjustment of the seat basin 102 and the seat cushion 103. The seat-basin height-adjustment motor can be mounted to the seat-cushion side panel 121 of the seat cushion 103 by means of the seat-basin height adjustment mechanism mounting portion 135.

As illustrated in FIG. 6, the ban-shaped height-adjustment gear 139 is provided with a height-adjustment limiting slot 140, and the height-adjustment limiting slot 140 is used to be fitted with a height-adjustment limiting protrusion on a mounting bracket for the seat-basin height-adjustment motor. The seat-basin height-adjustment motor is mounted on the mounting bracket which is in turn mounted to the seat-cushion side panel 121 and provided with the height-adjustment limiting protrusion, and the height-adjustment limiting slot 140 can be configured as an arc slot. When the height-adjustment limiting protrusion is located at an upper end of the height-adjustment limiting slot 140, the fan-shaped height-adjustment gear 139 stops rotating, and at this time, the seat-cushion seat-basin assembly 120 is at the highest position; when the height-adjustment limiting protrusion is located at a lower end of the height-adjustment limiting slot 140, the fan-shaped height-adjustment gear 139 stops rotating, and at this time, the seat-cushion seat-basin assembly 120 is at the lowest position. By providing the height-adjustment limiting slot 140 and the height-adjustment limiting protrusion, the height adjustment of the seat-cushion seat-basin assembly 120 can be in a reasonable range, thereby ensuring the reliability of height adjustment of the seat-cushion seat-basin assembly 120.

A mounting relationship between the shoulder adjustment mechanism 601 and the backrest frame 110, and a working principle of the shoulder adjustment mechanism 601 will be described in detail below with reference to FIGS. 7 and 8.

Figure 7:
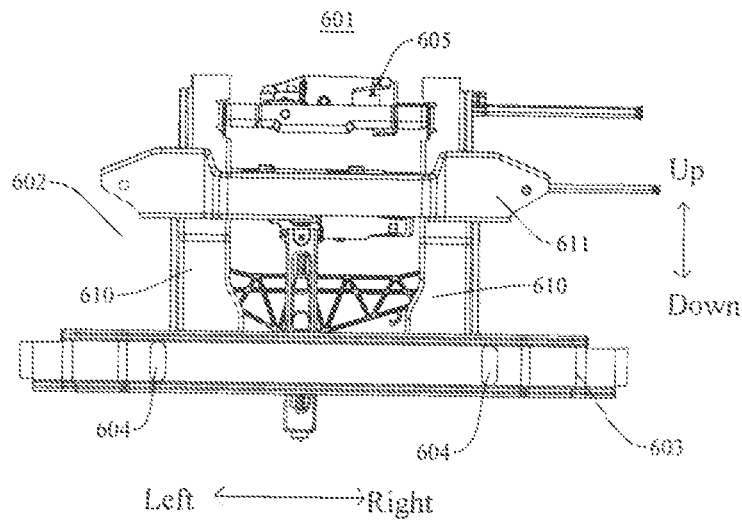
FIG. 7 is a structural schematic view of a shoulder adjustment mechanism.

As illustrated in FIG. 7, the shoulder adjustment mechanism 601 for the seat according to the embodiments of the present disclosure can include: a shoulder frame 602 and a shoulder-frame electrical driving part 605; the shoulder frame 602 includes a shoulder frame, rotating portion 603; and the shoulder frame rotating portion 603 can be pivotally mounted to the backrest frame 110 of the seat. It could be understood that the shoulder frame 602 can be mounted to the backrest frame 110 through the shoulder frame rotating portion 603, and the shoulder frame 602 can rotate relative to the backrest frame 110 with the shoulder frame rotating portion 603 as a pivot shaft. The shoulder frame rotating portion 603 can be pivotally mounted to the shoulder-adjustment-mechanism rotating-shaft mounting portion 132 of the backrest frame 110.

In one or more embodiments, as illustrated in FIG. 7, the shoulder frame 602 can further include: two shoulder-frame vertical plates 610, and a shoulder-frame horizontal connecting plate 611. The two shoulder-frame vertical plates 610 are oppositely arranged on the shoulder frame rotating portion 603, and the shoulder-frame horizontal connecting plate 611 is connected between middle portions of the two shoulder-frame vertical plates 610. The two shoulder-frame vertical plates 610 are spaced apart in the left-right direction, and extend in the vertical direction, while the shoulder-frame horizontal connecting plate 611 extends along the horizontal direction and mounted to the two shoulder-frame vertical plates 610, in which the shoulder-fame horizontal connecting plate 611 can be used to mount a fixed headrest, and an upper end of each shoulder-frame vertical plate 610 can be welded with a headrest welding pipe.

The shoulder frame rotating portion 603 is provided with a lumbar-support mounting hole 604 for mounting a lumbar support 501, and a connecting member (e.g. a hook) of the lumbar support 501 can be fitted in the lumbar-support mounting hole 604, such that the lumbar support 501 can be mounted below the shoulder frame rotating portion 603. Preferably, the lumbar support 501 can be hung at the lumbar-support mounting hole 604, such that the lumbar support 501 can be mounted and removed conveniently, thereby improving the installation efficiency of the seat. Preferably, as illustrated in FIG. 7, the lumbar-support mounting hole 604 can be an oblong hole, and a length direction of the lumbar-support mounting hole 604 is perpendicular to a length direction of the shoulder frame rotating portion 603. As illustrated in FIG. 7, the length direction of the lumbar-support mounting hole 604 is the up-down direction, while the length direction of the shoulder frame rotating portion 603 is the left-right direction. By configuring the lumbar-support mounting hole 604 as the oblong hole, the hook of the lumbar support 501 can be hung at the lumbar-support mounting hole 604 conveniently, and the influence of the production error on the assembling can be avoided, so as to further improve the installation efficiency of the seat.

In some embodiments, as illustrated in FIG. 7, a plurality of lumbar-support mounting holes 604 can be provided, and uniformly arranged on the shoulder frame rotating portion 603. As illustrated in FIG. 7, two lumbar-support mounting holes 604 are provided and distributed in the left-right direction. By providing the plurality of lumbar-support mounting holes 604, it is possible to guarantee the installation reliability of the lumbar support 501 on the shoulder frame rotating portion 603, and hence the installation reliability of the seat.

The shoulder-frame electrical driving part 605 is configured to drive the shoulder frame 602 to turn around the shoulder frame rotating portion 603. It could be understood that the shoulder-frame electrical driving part 605 can drive the shoulder frame 602 to rotate around the shoulder frame rotating portion 603, the headrest and shoulder of the seat can perform the angle adjustment relative to the backrest, and hence the driver can select a suitable angle, in which case the lumbar support 501 of the seat can support the lumbar region of the driver, the shoulder of the seat can support the shoulder of the driver, the headrest of the seat can support the head of the driver, thereby relieving driving fatigue of the driver and improving driving contort thereof.

According to one or more embodiments of the present disclosure, the shoulder-frame electrical driving part 605 can include a motor and a lead screw, the motor can drive, through the lead screw, the shoulder frame 602 to turn around the shoulder frame rotating portion 603, so as to realize the angle adjustment of the shoulder frame 602 in the front-rear direction. The working principles of the motor and the lead screw are known to those skilled in the art and will not be elaborated herein. The lead screw itself has a limiting function, such that the shoulder-frame electrical driving part 605 can have a simple and reliable structure. The motor of the shoulder-frame electrical driving part 605 is mounted to the backrest frame 110 through the shoulder-adjustment-mechanism motor mounting portion 131.

For the shoulder adjustment mechanism 601 for the seat according to the embodiment of the present disclosure, by providing the shoulder frame rotating portion 603 and the shoulder-frame electrical driving part 605, the angle adjustment of the shoulder frame 602 relative to the backrest frame 110 can be realized, and hence the driver can select a suitable angle, such that the lumbar support 501 of the seat can support the lumbar region of the driver, the shoulder of the seat can support the shoulder of the driver, the headrest of the seat can support the head of the driver, thereby relieving the driving fatigue of the driver and improving the driving comfort thereof.

According to one or more embodiments of the present disclosure, as illustrated in FIG. 8, the shoulder adjustment mechanism 601 can further include a driving-force balancing device 606 disposed between the shoulder-frame electrical driving part 605 and the shoulder frame 602. The driving-force balancing device 606 has a plurality of driving-force balancing device connecting portions 607 connected with the shoulder frame 602. Thus, the driving force transmitted from the shoulder-frame electrical driving part 605 to the driving-force balancing device 606 can be further transmitted to the shoulder frame 602 through the plurality of driving-force balancing device connecting portions 607. Hence, by providing the driving-force balancing device 606, the driving-force transmission between the shoulder-frame electrical driving part 605 and the shoulder frame 602 can be reliable and stable, thereby guaranteeing the stability of the angle adjustment of the shoulder frame 602, so as to improve the reliability of the seat. Preferably, the driving-force balancing device connecting portions 607 are spaced apart in the left-right direction of the shoulder frame 602, such that the driving force exerted on left and right sides of the shoulder frame 602 is uniform and stable, thereby guaranteeing the stability of the angle adjustment of the shoulder frame 602.

According to one or more embodiments of the present disclosure, as illustrated in FIG. 8, the driving-force balancing device 606 can include a shared connecting rod 608, and a plurality of branch connecting rods 609. The shared connecting rod 608 is connected with the shoulder-frame electrical driving part 605. One end of each branch connecting rod 609 is connected with the shared connecting rod 608, and the other end of each branch connecting rod 609 is connected with the shoulder frame 602, in which the end of each branch connecting rod 609 can be fixedly connected with the shared connecting rod 608, and the other end of each branch connecting rod 609 can be pivotally connected with the shoulder frame 602.

In some embodiments, the shoulder adjustment mechanism 601 can further include a memory module connected with the shoulder-frame electrical driving part 605. It could be understood that the memory module can memorize a frequently-used shoulder position of the driver. When the driver sits on the seat, the memory module can send an electric signal to the shoulder-frame electrical driving part 605 to enable the shoulder-frame electrical driving part 605 to drive the shoulder frame 602 to rotate around the shoulder frame rotating portion 603 to the frequently-used shoulder position, such that the driver can keep in a relatively comfortable driving state, thereby lowering operation difficulty of the driver and improving the driving comfort of the driver.

Further, the shoulder adjustment mechanism 601 can further include an identification module configured to identify the identity of the person sitting on the seat. The identification module is connected with the memory module and the shoulder-frame electrical driving part 605. It could be understood that when several people have driven a vehicle having the seat with the shoulder adjustment mechanism 601, the memory module can memorize a frequently-used shoulder position of each driver. When the driver drives this vehicle again, the identification module can identify the driver rapidly, and send a corresponding electric signal to the memory module, such that the memory module can control the shoulder-frame electrical driving part 605 to drive the shoulder frame 602 to rotate around the shoulder frame rotating portion 603 to the frequently-used shoulder position of this driver, thereby enhancing the driving comfort of the driver.

A mounting relationship between the backrest flank 801 and the backrest frame 110, and a working principle of the backrest flank 801 will be described in detail below with reference to FIGS. 9 and 10.

Figure 9:
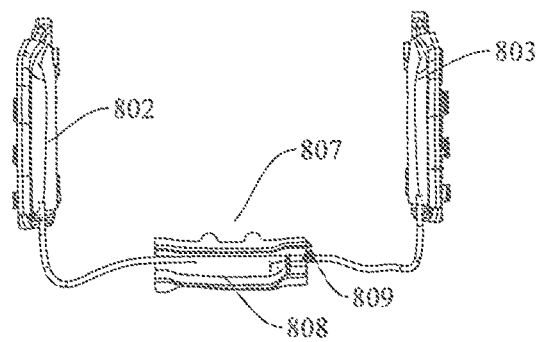
FIG. 9 is a schematic view of a backrest flank.

As illustrated in FIG. 9, the backrest flank 801 for the seat according to the embodiments of the present disclosure can include a left backrest flank 802 and a right backrest flank 803, and the left backrest flank 802 is disposed at a left side of the backrest frame, while the right backrest flank 803 is disposed at a right side of the backrest frame. As illustrated in FIG. 10, each of the left backrest flank 802 and the right backrest flank 803 includes a backrest flank fixing portion 804, a backrest flank rotating portion 805, and a backrest flank airbag 806. The backrest flank fixing portion 804 is suitable to be secured to the backrest frame of the seat, the backrest flank rotating portion 805 can be rotatably mounted to the backrest flank fixing portion 804, and the backrest flank airbag 806 is sandwiched between the backrest flank fixing portion 804 and the backrest flank rotating portion 805 and configured to be able to be inflated or deflated. It could be understood that when the backrest flank airbag 806 is inflated, the backrest flank airbag 806 is expanded, and since the backrest flank fixing portion 804 is secured to the backrest frame of the seat and the backrest flank rotating portion 805 is rotatable relative to the backrest flank fixing portion 804, the backrest flank airbag 806 can push the backrest flank rotating portion 805 inwards, such that the backrest flank rotating portion 805 can support the back of the driver better, thereby relieving the driving fatigue of the driver and improving the driving comfort thereof. When the backrest flank airbag 806 is deflated, the backrest flank airbag 806 shrinks, and the backrest flank rotating portion 805 rotates outwards, under the pressure of the back of the driver, till an initial position relative to the backrest flank fixing portion 804.

The backrest flank fixing portion 804 of the left backrest flank 802 is mounted to the side panel 112 at the left side by means of the backrest flank mounting portion 133, and the backrest flank fixing portion 804 of the right backrest flank 803 is mounted to the side panel 112 at the right side by means of the backrest flank mounting portion 133.

Figure 10:
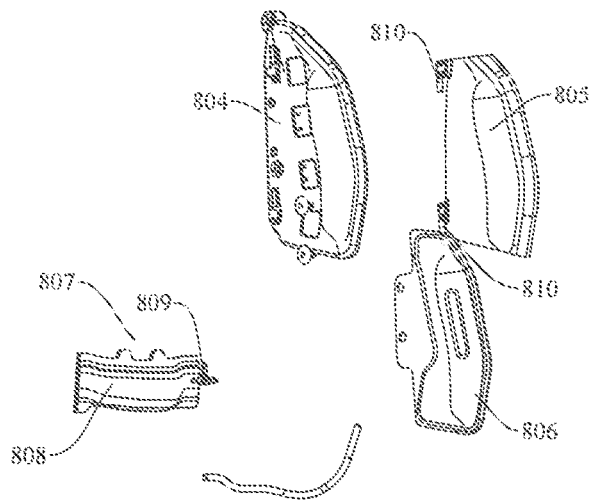
FIG. 10 is a schematic view of an air power source and a right backrest flank in the backrest flank.

As illustrated in FIGS. 9 and 10, optionally; the backrest flank 801 can further include an air power source 807 connected with the backrest flank airbag 806 of the left backrest flank 802 and the backrest flank airbag 806 of the right backrest flank 803. It could be understood that the air power source 807 can inflate the backrest flank airbag 806 of the left backrest flank 802 and the backrest flank airbag 806 of the right backrest flank 803 separately. Specifically, as illustrated in FIG. 10, the air power source 807 can include an inflating pump 808, and an air valve 809 disposed to the inflating pump 808. The air valve 809 is connected with the backrest flank airbag 806 through an air pipe. The air valve 809 can control connection or disconnection between the inflating pump 808 and the backrest flank airbag 806. When the inflating pump 808 is working and the air valve 809 is in an open state, the inflating pump 808 inflates the backrest flank airbag 806; when the inflating pump 808 stops working and the air valve 809 is in a closed state, the inflating pump 808 stops inflating the backrest flank airbag 806.

The left backrest flank 802 and the right backrest flank 803 can be inflated and deflated in various ways, two ways of which will be described below in detail. Optionally, the backrest flank airbag 806 of the left backrest flank 802 and the backrest flank airbag 806 of the right backrest flank 803 are configured to be inflated or deflated synchronously. It could be understood that the left backrest flank 802 and the right backrest flank 803 inflated or deflated synchronously can support the back of the driver better, and massage the hack of the driver more stably, thereby improving the driving comfort of the driver.

In some embodiments, each backrest flank airbag 806 is configured to be inflated and deflated in an alternate manner, in which each backrest flank airbag 806 can be deflated and inflated periodically, such that the backrest flank 801 can massage the back of the driver better, relieve the driving fatigue of the driver, and improve the driving comfort thereof. Moreover, the backrest flank airbag 806 in the left backrest flank 802 and the backrest flank airbag 806 in the right backrest flank 803 can be inflated and deflated alternately, i.e., when the backrest flank airbag 806 in the left backrest flank 802 is deflated, the backrest flank airbag 806 in the right backrest flank 803 can be inflated, such that by adjusting the inflation and deflation of the backrest flank airbags 806 in the backrest flank 801 constantly, it is possible to massage the back of the driver better and improve the driving comfort of the driver.

Additionally, a separate air pipe is connected between the air power source 807 and each backrest flank airbag 806. In other words, two backrest flank airbags 806 are arranged in parallel through the air pipes. The air valve 809 of the air power source 807 can control the connection and disconnection between the air power source 807 and each backrest flank airbag, such that when the air valve 809 makes one backrest flank airbag 806 connected, the air valve 809 makes the other backrest flank airbag 806 disconnected, thereby allowing the two backrest flank airbags 806 to be inflated and deflated alternately.

According to one or more embodiments of the present disclosure, a rear side of the backrest flank rotating portion 805 can be rotatably connected with the backrest flank fixing portion 804, and the backrest flank airbag 806 is configured in such a way that an expansion thickness of a front portion of the backrest flank airbag 806 is greater than an expansion thickness of a rear portion of the backrest flank airbag 806 after inflation. It could be understood that after the backrest flank airbag 806 is inflated, the expansion thickness of the front portion of the backrest flank airbag 806 is greater than that of the rear portion of the backrest flank airbag 806, and hence a front portion of the backrest flank 801 can support the back of the driver better, i.e. the backrest flank 801 can form an effective support to the hack of the driver to improve the driving comfort of the driver. Preferably, the front portion of the backrest flank airbag 806 can be formed with a pleated portion. Hence, after the backrest flank airbag 806 is inflated, the pleated portion can be unfolded to make the expansion thickness of the front portion of the backrest flank airbag 806 greater than that of the rear portion thereof.

In one or more embodiments, as illustrated in FIG. 10, the backrest flank fixing portion 804 can be configured as a backrest flank fixing plate, the backrest flank rotating portion 805 can be configured as a backrest flank rotating plate, and a backrest flank airbag mounting space is defined between the backrest flank fixing plate and the backrest flank rotating plate. By configuring the backrest flank fixing portion 804 and the backrest flank rotating portion 805 as plate structures, it is possible to make the structure of the backrest flank 801 simple and reliable, and make the backrest flank 801 relatively lightweight, so as to conform to the lightweight design of the vehicle.

In some embodiments, as illustrated in FIG. 10, the backrest flank airbag 806 can be detachably secured to the backrest flank fixing plate through a snap structure, and upper and lower portions of the backrest flank rotating plate are rotatably disposed to the backrest flank fixing plate through a backrest flank rotating shaft 810 separately. Thus, the backrest flank airbag 806 and the backrest flank fixing plate can be detached from each other, so as to facilitate the replacement of the backrest flank airbag 806 and the backrest flank fixing plate, thereby lowering the replacement cost. Moreover, by providing two backrest flank rotating shafts 810 spaced apart in the up-down direction, the reliability of rotation of the backrest flank rotating plate relative to the backrest flank fixing plate can be improved.

For the backrest flank 801 for the seat according to the embodiment of the present disclosure, by providing the backrest flank airbag 806 that can be inflated and deflated, the left backrest flank 802 and the right backrest flank 803 can expand and shrink; when the left backrest flank 802 and the right backrest flank 803 expand, the left backrest flank 802 and the right backrest flank 803 can support the back of the driver effectively to improve the driving comfort of the driver.

Figure 11:
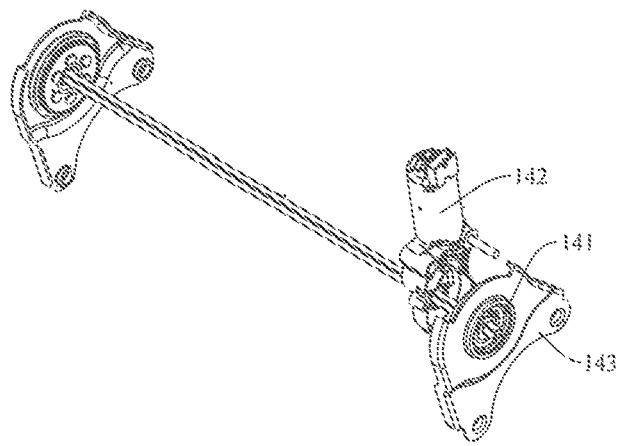
FIG. 11 is a schematic view of a backrest-frame recliner.

The backrest-frame recliner 141 and the backrest frame 110, as well as the mounting relationship between the backrest-frame recliner 141 and the seat cushion 103 and the working principle of the backrest-frame recliner 141 will be described below in detail with reference to FIGS. 1 and 11.

The backrest frame 110 is mounted on the seat cushion 103 through the backrest-frame mounting plate 143; a fixing disc of the backrest-frame recliner 141 is secured to the backrest-frame mounting plate 143, and a rotating disc of the backrest-frame recliner 141 is secured to the side panel 112 of the backrest frame 110; the backrest-frame recliner drive motor 142 is secured to the side panel 112 of the backrest frame 110; the backrest-frame recliner mounting portion 134 includes a mounting hole for mounting the backrest-frame recliner drive motor 142 and a mounting hole for mounting the backrest-frame recliner 141.

The backrest-frame recliner drive motor 142 drives the rotating disc of the backrest-frame recliner 141 to rotate relative to the fixing disc thereof, so as to realize the rotation of the backrest frame 110 relative to the seat cushion 103, thereby achieving the angle adjustment of the backrest frame 110 in the front-rear direction.

A mounting relationship between the seat basin 102 and the seat-basin flank 901 and a working principle of the seat-basin flank 901 are described below in detail with reference to FIGS. 12-15.

Figure 12:
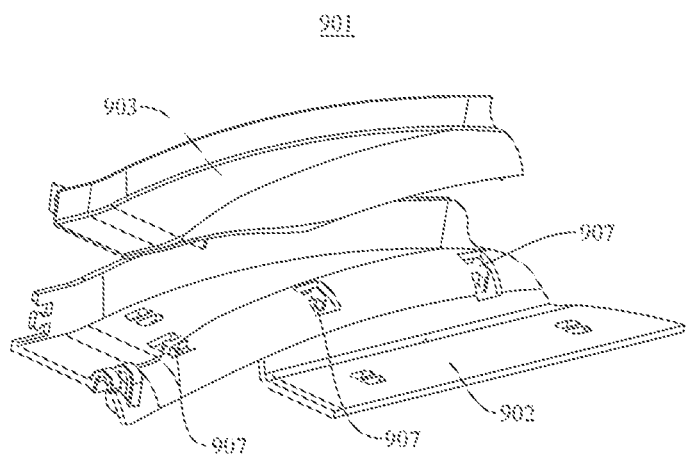
FIG. 12 is an exploded view of a seat-basin flank.

As illustrated in FIG. 12, the seat-basin flank 901 for the seat according to embodiments of the present disclosure can include a seat-basin flank fixing plate 902 and a seat-basin flank airbag 903, and the seat-basin flank fixing plate 902 can be disposed to two sides of the seat basin of the seat separately. For example, two seat-basin flank fixing plates 902 can be provided and disposed at left and right sides of the seat basin 102, respectively. The seat-basin flank fixing plates 907 can be disposed to the two sides of the seat basin 102 through the seat-basin flank mounting portions.

Figure 14:
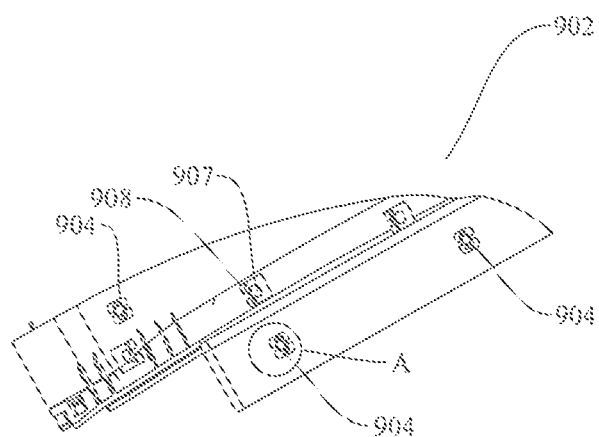
FIG. 14 is a schematic view of a seat-basin flank fixing plate in the seat-basin flank.

In some embodiments, as illustrated in FIG. 14, the seat-basin flank fixing plate 902 can be detachably snapped to the seat basin 102 through a seat-basin flank snap 904. By providing the seat-basin flank snap 904, the seat-basin flank fixing plate 902 can be mounted to and detached from the seat basin 102 conveniently, which can improve the installation and removal efficiency of the seat-basin flank 901 and can ensure the reliability of the installation of the seat-basin flank fixing plate 902 to the seat basin 102.

Figure 15:
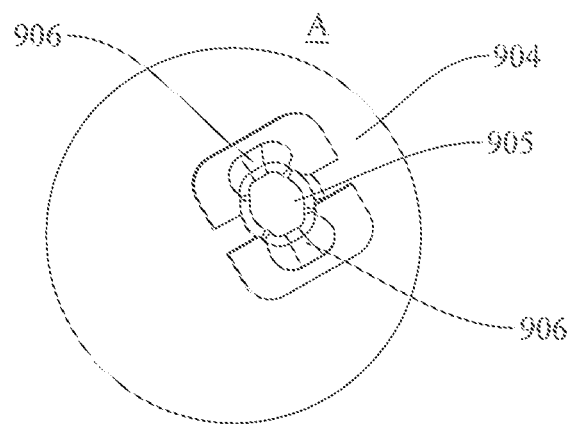
FIG. 15 is an enlarged view of region A in FIG. 14.

In one or more embodiments, as illustrated in FIG. 15, the seat-basin flank snap 904 can include a seat-basin flank snap body 905 and a seat-basin flank snap elastic arm 906. The seat-basin flank snap elastic arm 906 has a fixed end and a free end, and the fixed end of the seat-basin flank snap elastic arm 906 is secured to the seat-basin flank snap body 905. The seat-basin flank snap body 905 can extend vertically downwards from a lower surface of the seat-basin flank fixing plate 902. The seat-basin flank snap elastic arm 906 is suitable for elastic deformation, such that when the seat-basin flank fixing plate 902 is mounted, the seat-basin flank snap body 905 can extend into a mounting hole in the seat basin 102 (i.e. an interior of the seat-basin flank mounting portion), and at this time, the seat-basin flank snap elastic arm 906 can be elastically deformed to extend into the mounting hole in the seat basin; after the seat-basin flank snap elastic arm 906 fully extends into the mounting hole, the seat-basin flank snap elastic arm 906 can stretch to prevent the seat-basin flank snap body 905 from coming out of the mounting hole, so as to ensure the reliability of the installation between the seat-basin flank fixing plate 902 and the seat basin.

In some embodiments, as illustrated in FIG. 15, the fixed end of the seat-basin flank snap elastic arm 906 is secured to a lower end of the seat-basin flank snap body 905, and the free end of the seat-basin flank snap elastic arm 906 extends upwards in a direction away from the seat-basin flank snap elastic arm 906. Thus, during the installation of the seat-basin flank fixing plate 902, a side wall of the mounting hole can press the free end of the seat-basin flank snap elastic arm 906 towards the seat-basin flank snap body 905, and after the seat-basin flank snap elastic arm 906 passes through the mounting hole completely, the seat-basin flank snap elastic arm 906 stretches to prevent the seat-basin flank snap body 905 from coming out of the mounting hole. Preferably, as illustrated in FIG. 15, a plurality of seat-basin flank snap elastic arms 906 can be provided, and surround the seat-basin flank snap body 905 along a circumferential direction.

The seat-basin flank airbag 903 is disposed to the seat-basin flank fixing plate 902, and the seat-basin flank airbag 903 is configured in such a way that an expansion height of an outer side of the seat-basin flank airbag 903 is greater than an expansion height of an inner side thereof when inflated. It could be understood that when the seat-basin flank airbag 903 is inflated, the seat-basin flank airbag 903 is expanded, and the outer side of the seat-basin flank airbag 903 is expanded having a greater thickness, such that the shape of the seat-basin flank airbag 903 can match the shape of the hip and legs of the human body, to enable the seat-basin flank 901 to support the hip and legs of the driver better, thereby relieving the driving fatigue of the driver and improving the driving comfort thereof.

Figure 13:
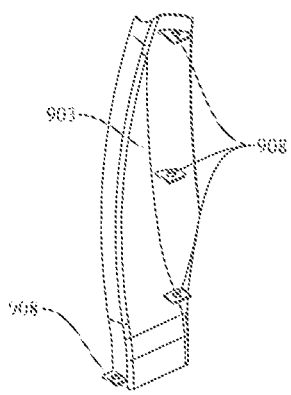
FIG. 13 is a schematic view of a seat-basin flank airbag in the seat-basin flank.

According to one or more embodiments of the present disclosure, as illustrated in FIGS. 12 and 13, the seat-basin flank fixing plate 902 is also provided with a seat-basin flank protruding portion 907, the seat-basin flank airbag 903 is provided with seat-basin flank airbag fixing plate 908, and the seat-basin flank airbag fixing plate 908 is snapped with the seat-basin flank protruding portion 907. Hence, through the snap fit between the seat-basin flank airbag fixing plate 908 and the seat-basin flank protruding portion 907, the seat-basin flank airbag 903 can be better mounted to the seat-basin flank fixing plate 902 to ensure the structural reliability of the seat-basin flank 901. Moreover, the snap fit can facilitate the installation and removal of the seat-basin flank airbag 903.

In some embodiments, as illustrated in FIG. 12, the seat-basin flank protruding portion 907 has a fixed end and a free end, and the free end of the seat-basin flank protruding portion 907 extends to both sides separately to configure the seat-basin flank protruding portion 907 in a "T" shape. It could be understood that the T-shaped seat-basin flank protruding portion 907 can limit the seat-basin flank airbag fixing plate 908 effectively to ensure the reliability of the installation of the seat-basin flank airbag 903 to the seat-basin flank fixing plate 902.

In one or more embodiments, the seat-basin flank 901 can further include a seat-basin flank inflating device for inflating the seat-basin flank airbag 903, and the seat-basin flank inflating device can be connected with the seat-basin flank airbag 903 through a seat-basin flank inflating hose. The seat-basin flank inflating device can be an inflating pump and an air valve, and the seat-basin flank inflating device can be disposed to the seat basin 102 and inflate the seat-basin flank airbags 903 located at two sides.

Additionally, each seat-basin flank airbag 903 can be configured to be inflated and deflated alternately. It could be understood that the seat-basin flank airbag 903 inflated and deflated alternately can massage the hip and legs of the driver at least to a certain extent when supporting the hip and legs of the driver effectively, so as to relieve the driving fatigue of the driver and improve the driving comfort thereof.

In some embodiments, a separate air pipe is connected between the seat-basin flank inflating device and each seat-basin flank airbag 903. In other words, two seat-basin flank airbags 903 are arranged in parallel through the air pipes. The air valve of the seat-basin flank inflating device can control the connection and disconnection between the inflating pump and each seat-basin flank airbag 903, such that when the air valve makes one seat-basin flank airbag 903 connected, the air valve makes the other seat-basin flank airbag 903 disconnected, thereby allowing the two seat-basin flank airbags 903 to be inflated and deflated alternately.

For the seat-basin flank 901 for the seat according the embodiment of the present disclosure, the inflated seat-basin flank airbag 903 can match the hip and legs of the human body in shape, such that the seat-basin flank 901 can support the hip and legs of the human body better, thereby relieving the driving fatigue of the driver, and improving the driving comfort thereof.

A mounting relationship among the seat-basin tilt adjustment mechanism 201, the seat basin 102 and the seat cushion 103, and a working principle of the seat-basin tilt adjustment mechanism 201 according to embodiments of the present disclosure will be described in detail with reference to FIGS. 16 and 17.

Figure 16:
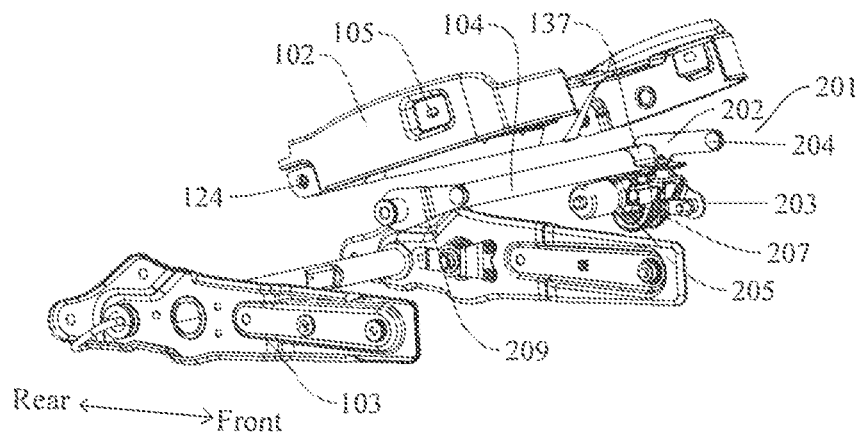
FIG. 16 is a schematic view of a seat-basin tilt adjustment mechanism, a seat basin, and a seat cushion.
Figure 17:
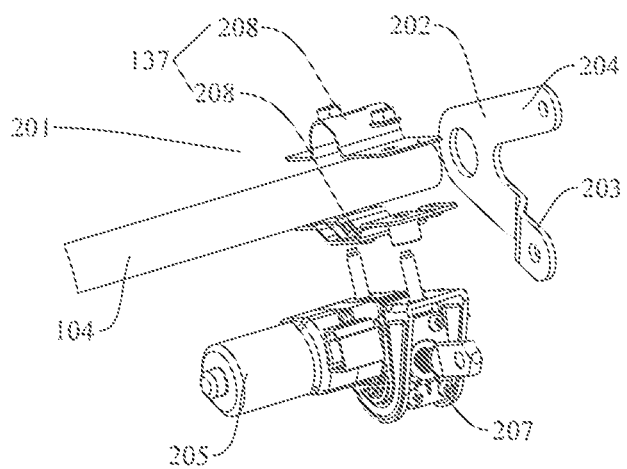
FIG. 17 is an exploded view of a seat-basin tilt adjustment mechanism.

As illustrated in FIGS. 16 and 17, the seat-basin tilt adjustment mechanism 201 for the seat according to embodiments of the present disclosure can include a seat-basin tilt adjustment bracket 202 and a seat-basin tilt adjustment motor 205. The seat includes the seat basin 102 and the seat cushion 103. The seat cushion 103 includes the front linkage rod 104, and the seat-basin tilt adjustment bracket 202 is fitted over the front linkage rod 104. The seat-basin tilt adjustment bracket 202 can rotate relative to the front linkage rod 104, and the seat-basin tilt adjustment bracket 202 has a first connecting end 203, and a second connecting end 204 that is fitted with the seat basin 102.

The seat-basin tilt adjustment motor 205 is mounted to the front linkage rod 104 through the seat-basin tilt adjustment mechanism mounting portion 137. The seat-basin tilt adjustment motor 205 is configured to drive the first connecting end 203 to rotate the seat-basin tilt adjustment bracket 202 around a central axis of the front linkage rod 104. During the rotation of the seat-basin tilt adjustment bracket 202, the second connecting end 204 of the seat-basin tilt adjustment bracket 202 drives the seat basin 102 to rotate around the seat-basin rotation center 125 to change a tilt of the seat basin 102. Thus, the seat-basin tilt adjustment motor 205 can drive the tilt adjustment of the seat basin 102 relative to the seat cushion 103 by means of the seat-basin tilt adjustment bracket 202, so as to adjust the seat basin 102 to the desired angle of the driver. Moreover, the seat-basin tilt adjustment mechanism 201 has the simple and reliable structure and is lightweight, and hence the seat frame 101 satisfies the lightweight requirement of the vehicle.

In some embodiments, the seat-basin tilt adjustment motor 205 can be configured to drive the seat-basin tilt adjustment lead screw 207 to translate forwards and backwards, and a front end of the seat-basin tilt adjustment lead screw 207 is connected with the first connecting end 203 of the seat-basin tilt adjustment bracket 202. It could be understood that the seat-basin tilt adjustment motor 205 can drive the seat-basin tilt adjustment lead screw 207 to move forwards and backwards, such that the seat-basin tilt adjustment motor 205 can drive, by means of the seat-basin tilt adjustment lead screw 207, the first connecting end 203 of the seat-basin tilt adjustment bracket 202 to move forwards and backwards, and the second connecting end 204 of the seat-basin tilt adjustment bracket 202 is moved accordingly, which can enable the seat basin 102 to rotate around the seat-basin rotation center 125, realize the angle adjustment of the seat basin 102, and hence allow the driver to adjust the seat basin 102 to a comfortable angle. The left and right sides of the seat basin 102 are provided with the seat-basin rotation hole 124 separately, and a connection line between two seat-basin rotation holes 124 is a central rotation axis of the seat basin 102.

Additionally, the front portions of left and right sides of the seat basin 102 can be provided with the seat-basin oblong slot 105 separately, and the second connecting end 204 of the seat-basin tilt adjustment bracket 202 is fitted with the seat-basin oblong slot 105 to allow the second connecting end 204 of the seat-basin tilt adjustment bracket 202 to slide in the seat-basin oblong slot 105. It could be understood that by providing the seat-basin oblong slot 105, the second connecting end 204 of the seat-basin tilt adjustment bracket 202 can move forwards and backwards in the seat-basin oblong slot 105 when driving the seat basin 102 to rotate around the seat-basin rotation center 125, so as to cooperate with the forward and backward movement of the first connecting end 203 of the seat-basin tilt adjustment bracket 202. Specifically, the length direction of the seat-basin oblong slot 105 can extend along the front-rear direction.

According to one or more embodiments of the present disclosure, as illustrated in FIGS. 16 and 17, the seat-basin tilt adjustment bracket 202 can be V-shaped. The seat-basin tilt adjustment bracket 202 is fitted over the front linkage rod 104 at an intersection of the V-shaped seat-basin tilt adjustment bracket 202, and two ends of the V-shaped seat-basin tilt adjustment bracket 202 are configured as the first connecting end 203 and the second connecting end 204. The intersection of the seat-basin tilt adjustment bracket 202 is formed with a mounting hole, and the front linkage rod 104 is fitted in the mounting hole. The first connecting end 203 is located below the second connecting end 204.

In some embodiments, as illustrated in FIG. 17, the seat-basin tilt adjustment mechanism mounting portion 137 can include two seat-basin tilt adjustment mechanism mounting sub-portions 208 arranged oppositely in the up-down direction. The two seat-basin tilt adjustment mechanism mounting sub-portions 208 are snapped together to clamp the front linkage rod 104 therebetween. The seat-basin tilt adjustment motor 205 is fastened to the two seat-basin tilt adjustment mechanism mounting sub-portions 208 by a mounting bracket for the seat-basin tilt adjustment motor 205. Specifically, the two seat-basin tilt adjustment mechanism mounting sub-portions 208 each have an arc structure to be snapped together and to clamp the front linkage rod 104, and the two seat-basin tilt adjustment mechanism mounting sub-portions 208 are fixedly connected through a fastener, so as to ensure the reliability of the installation of the seat-basin tilt adjustment motor 205 to the front linkage rod 104.

The arrangement of the seat-basin tilt adjustment bracket 202 will be described in detail below. In one or more embodiments, as illustrated in FIG. 16, one seat-basin tilt adjustment bracket 202 can be provided and located at an end of the front linkage rod 104; the other end of the front linkage rod 104 is provided with a driven tilt adjustment bracket 209; an end of the driven tilt adjustment bracket 209 is fitted over the front linkage rod 104, while the other end of the driven tilt adjustment bracket 209 is fitted in the oblong slot. By providing the driven tilt adjustment bracket 209, the process of the tilt adjustment of the seat basin 102 can be stable and smooth, which can make the operation of the seat-basin tilt adjustment mechanism 201 reliable.

In some embodiments, one seat-basin tilt adjustment bracket 202 can be provided and located in the middle of the front linkage rod 104. By disposing, the seat-basin tilt adjustment bracket 202 in the middle of the front linkage rod 104, the left and right sides of the seat basin 102 can be simultaneously subjected to the same adjustment force, such that the tilt adjustment of the seat basin 102 can be reliable and stable, and the structure of the seat-basin tilt adjustment mechanism 201 can become simple and reliable.

Additionally, two seat-basin tilt adjustment brackets 202 can be provided and symmetrically arranged at two ends of the front linkage rod 104. The seat-basin tilt adjustment motor 205 drives the two seat-basin tilt adjustment brackets 202 to operate synchronously. Thus, the adjustment forces transmitted by the seat-basin tilt adjustment bracket 202 to the left and right sides of the seat basin 102 are the same, such that the tilt adjustment of the seat basin 102 can be reliable and stable, and the operational reliability of the seat-basin tilt adjustment mechanism 201 can be improved.

For the seat-basin tilt adjustment mechanism 201 for the seat according to the embodiments of the present disclosure, by providing the seat-basin tilt adjustment bracket 202 and the seat-basin tilt adjustment motor 205, the tilt adjustment of the seat basin 102 can be realized, and hence the driver can adjust the seat basin 102 to a relatively comfortable angle, thereby relieving the driving fatigue of the driver and improving the driving comfort thereof. Moreover, the seat-basin tilt adjustment mechanism 201 has the simple and reliable structure, and fewer components and parts, thereby satisfying the lightweight requirement of the vehicle.

A mounting relationship between the thigh support 301 and the seat basin 102 as well as a working principle of the thigh support 301 according to embodiments of the present disclosure will be described in detail with reference to FIGS. 18-23.

Figure 18:
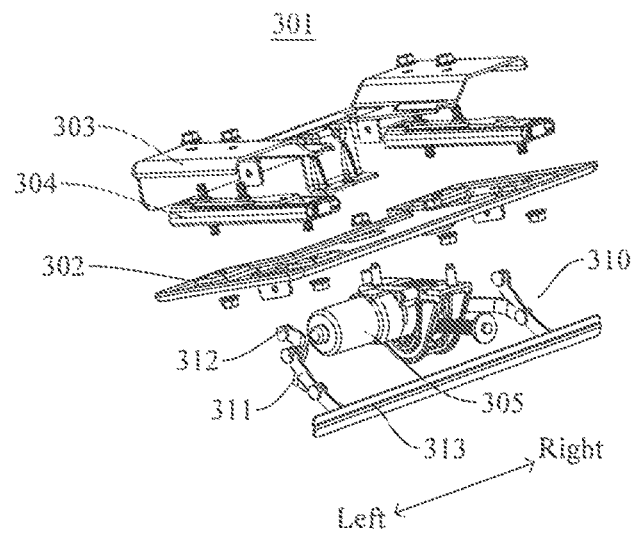
FIG. 18 is an exploded view of a thigh support for a seat.
Figure 19:
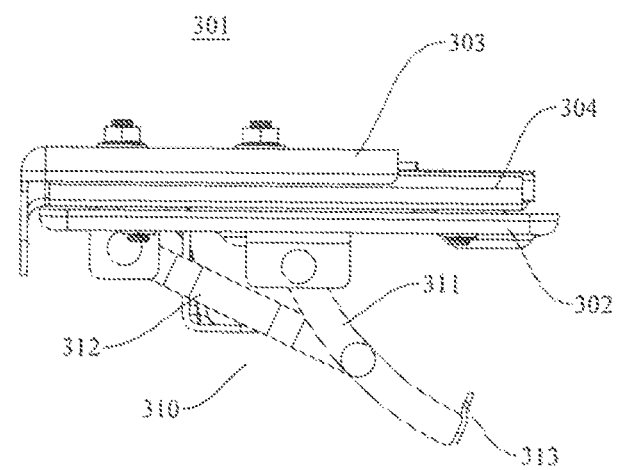
FIG. 19 is a side view of a thigh support for a seat.

The thigh support 301 for the seat according to embodiments of the present disclosure can include a thigh-support fixing portion 302, a thigh-support moving portion 303, a thigh-support driving portion 305, and a thigh-support bracing portion 306. As illustrated in FIGS. 18 and 19, a thigh-support guiding portion 304 is provided between the thigh-support moving portion 303 and the thigh-support fixing portion 302, and the thigh-support moving portion 303 can move forwards and backwards relative to the thigh-support fixing portion 302 under the guidance of the thigh-support guiding portion 304; and the thigh-support moving portion 303 has a forward limit position where it moves forwards to a limit position. The thigh-support guiding portion 304 can include a fixed rail and a moving rail that can be movably disposed on the fixed rail, the fixed rail is mounted to the thigh-support fixing portion 302, and the moving rail is mounted to the thigh-support moving portion 303. The thigh-support fixing portion 302 is mounted to the seat basin 102 through the thigh-support mounting portion 127.

The thigh-support driving portion 305 is configured to drive the thigh-support moving portion 303 to move forwards and backwards. The thigh-support driving portion 305 can include a motor and a lead screw, and a drive worm gear can be arranged between the motor and the lead screw, such that the motor can drive the lead screw to move forwards and backwards through the drive worm gear, and the lead screw in turn can drive the thigh-support moving portion 303 to move forwards and backwards, in which the motor can be secured to a lower surface of the thigh-support fixing portion 302.

Figure 20:
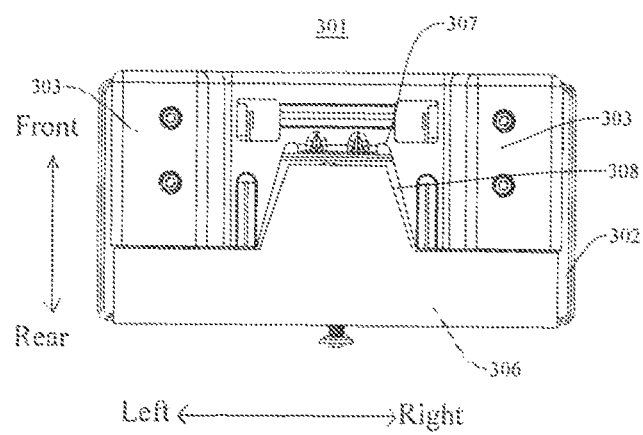
FIG. 20 is a schematic view of a thigh support for a seat.
Figure 21:
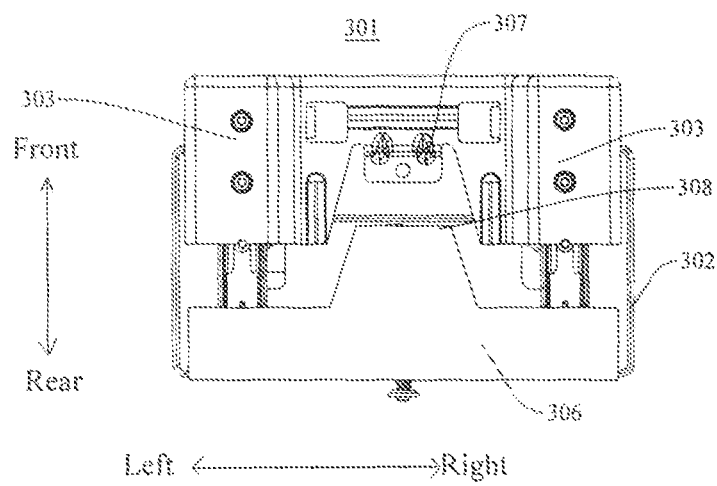
FIG. 21 is a schematic view of a thigh support for a seat, in which a thigh-support moving plate moves to a forward limit position.

As illustrated in FIGS. 20 and 21, the thigh-support bracing portion 306 is provided to the thigh-support fixing portion 302, and the thigh-support bracing portion 306 is located at a rear side of the thigh-support moving portion 303. A part of the thigh-support bracing portion 306 is flush with a rear edge of the thigh-support moving portion 303 in the forward limit position, or a part of the thigh-support bracing portion 306 is located in front of the rear edge of the thigh-support moving portion 303 in the forward limit position. It could be understood that a front part of the thigh-support bracing portion 306 may be flush with the rear edge of the thigh-support moving portion 303 when the thigh-support moving portion 303 moves forwards to the forward limit position, or a front part of the thigh-support bracing portion 306 can be located in front of the rear edge of the thigh-support moving portion 303 when the thigh-support moving portion 303 move forwards to the forward limit position, such that the thigh-support bracing portion 306 can support a region vacated by the forward movement of the rear edge of the thigh-support moving portion 303 when the thigh-support moving portion 303 moves forwards to the forward limit position, so as to effectively prevent a seat cover from collapsing downward, thereby ensuring good experience of the driver sitting on the seat, and improving the aesthetics of the seat.

Additionally, an upper surface of the thigh-support bracing portion 306 can be flush with an upper surface of the thigh-support moving portion 303, such that the seat cover laid on the thigh-support bracing portion 306 and the thigh-support moving portion 303 is flush, which can ensure the aesthetic appearance of the seat and avoid bad experience of the driver due to unevenness of the seat cover.

In some embodiments, as illustrated in FIGS. 20 and 21, the rear edge of the thigh-support moving portion 303 can be provided with a rear edge recessed portion 307 recessed forwards, and a front edge of the thigh-support bracing portion 306 is formed with a front edge protruding portion 308 protruding forwards, in which the front edge protruding portion 308 matches the rear edge recessed portion 307 in shape. Thus, by providing the faint edge protruding portion 308, or by enabling a front edge of the front edge protruding portion 308 to be located in front of a rear edge of the rear edge recessed portion 307, the front edge protruding portion 308 can support the seat cover effectively to prevent the seat cover from collapsing and hence ensure the aesthetic appearance of the seat.

In one or more embodiments, as illustrated in FIGS. 20 and 21, when the thigh-support moving portion 303 is in an initial position, the front edge protruding portion 308 is embedded in the rear edge recessed portion 307, and the front edge of the thigh-support bracing portion 306 abuts the rear edge of the thigh-support moving portion 303. When the thigh-support moving portion 303 is in the forward limit position, the rear edge of the thigh-support moving portion 303 is spaced apart from the front edge of the thigh-support bracing portion 306 in the front-rear direction, and the front edge of the front edge protruding portion 308 is flush with or located in front of the rear edge of the thigh-support moving portion 303. It could be understood that when the thigh support moving portion 303 is in the initial position, the thigh-support bracing portion 306 and the thigh-support moving, portion 303 are in good abutment, so as to ensure the aesthetic appearance of the seat cover; when the thigh-support moving portion 303 is located in the forward limit position, no space is left between the thigh-support bracing portion 306 and the thigh-support moving portion 303 in the front-rear direction, so as to prevent the seat cover from collapsing and ensure the aesthetic appearance of the seat cover.

According to one or more embodiments of the present disclosure, as illustrated in FIGS. 20 and 21, the thigh-support bracing portion 306 can be configured as a support flat plate, and the front edge protruding portion 308 is a trapezoidal plate integrally formed on a front edge of the support flat plate. Thus, the thigh-support bracing portion 306 has a simple structure and low cost. In one or more embodiments, as illustrated in FIGS. 20 and 21, the front edge protruding portion 308 can be located in the middle of the thigh-support bracing portion 306 in the left-right direction. By providing the front edge protruding portion 308 in the middle of the thigh-support bracing portion 306, the front edge protruding portion 308 can effectively divide the region vacated by the forward movement of the thigh-support moving portion 303, such that the area of each vacant region can be small, and will not be easy to form a collapse, thereby keeping the seat cover aesthetic.

Figure 22:
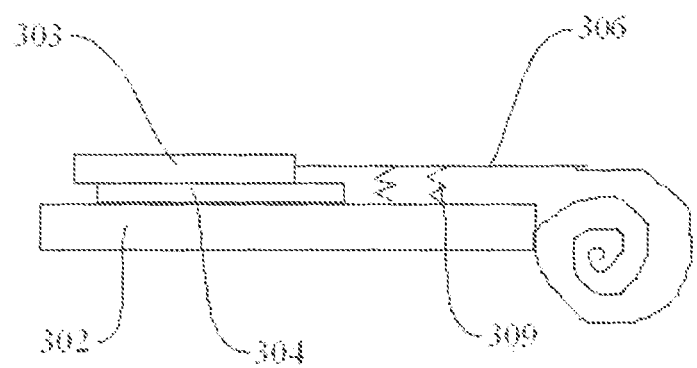
FIG. 22 is a partial schematic view of a thigh support for a seat.

According to some embodiments of the present disclosure, as illustrated in FIG. 22, the thigh-support bracing portion 306 can be configured as a rollable retractable sheet having a fixed end and a moving end. The moving end of the retractable sheet is secured to the rear edge of the thigh-support moving portion 303, such that the thigh-support moving portion 303 stretches the retractable sheet forwards by pulling the moving end of the retractable sheet, when the thigh-support moving portion 303 moves forwards. It could be understood that when the thigh-support moving portion 303 moves forwards to the forward limit position, the retractable sheet covers the region vacated by the forward movement of the thigh-support moving portion 303, and can support the seat cover thereon, so as to effectively prevent the seat cover from collapsing and improve the aesthetic appearance of the seat.

In one more embodiments, as illustrated in FIG. 22, the thigh support 301 can further include an elastic thigh-support bracing portion 309 that is adapted to be elastically supported at a bottom of the stretched retractable sheet. Hence, after the thigh-support moving portion 303 moves forwards to the forward limit position, the elastic thigh-support bracing portion 309 can support the retractable sheet effectively, so as to enhance the strength of the support of the retractable sheet to the seat cover thereon, thereby improving the aesthetic appearance of the seat.

Figure 23:
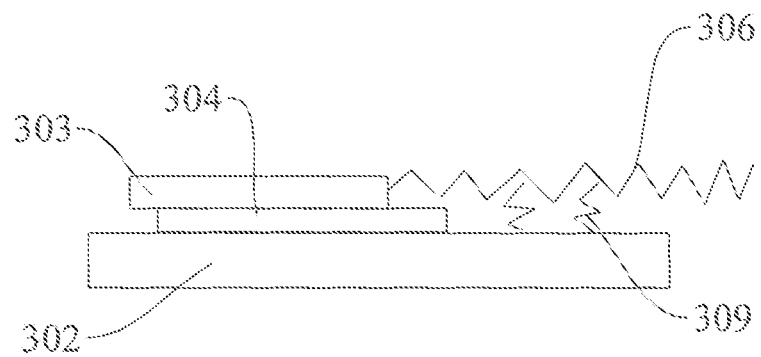
FIG. 23 is a partial schematic view of a thigh support for a seat.

According to one or more embodiments of the present disclosure, as illustrated in FIG. 23, the thigh-support bracing portion 306 is configured as a pleated plate having a plurality of pleated structures. The pleated plate has a fixed end and a moving end, and the moving end of the pleated plate is secured to the rear edge of the thigh-support moving portion 303, such that the thigh-support moving portion 303 flattens the pleated plate by pulling the moving end of the pleated plate when the thigh-support moving portion 303 moves forwards. It could be understood that after the thigh-support moving portion 303 moves forwards to the forward limit position, the pleated plate can be stretched to cover the region vacated by the forward movement of the thigh-support moving portion 303, and can support the seat cover thereon, so as to prevent the seat cover from collapsing effectively and improve the aesthetic appearance of the seat.

In some embodiments, as illustrated in FIG. 23, the thigh support 301 can further include the elastic thigh-support bracing portion 309 that is adapted to be elastically supported at a bottom of the flattened pleated plate. Hence, after the thigh-support moving portion 303 moves forwards to the forward limit position, the elastic thigh-support bracing portion 309 can support the pleated plate effectively, so as to enhance the strength of the support of the pleated plate to the seat cover thereon, thereby improving the aesthetic appearance of the seat.

According to one or more embodiments of the present disclosure, as illustrated in FIGS. 18 and 19, the thigh support 301 can further include two groups of thigh-support linkage structures 310 spaced in the left right direction. The thigh-support linkage structure 310 includes a thigh-support fixing portion connecting rod 311 and a thigh-support moving portion connecting rod 312. An end of the thigh-support moving portion connecting rod 312 is connected with the thigh-support moving portion 303, and the other end of the thigh-support moving portion connecting rod 312 is pivotally connected with the thigh-support fixing portion connecting rod 311. An end of the thigh-support fixing portion connecting rod 311 is pivotally connected with the thigh-support fixing portion 302, and a synchronizing rod 313 is provided between the other end of the thigh-support fixing portion connecting rod 311 in the left and the other end of the thigh-support fixing portion connecting rod 311 in the right, in which a lower end of the seat cover of the seat is secured to the synchronizing rod 313. By providing the two groups of thigh-support linkage structures 310, it is possible to ensure the stability of extending the seat cover, and the synchronizing rod 313 extends in the left-right direction, it could be understood that when the thigh-support driving portion 305 drives the thigh-support moving portion 303 to move forwards and backwards, the thigh-support moving portion connecting rod 312 moves forwards and backwards along with the thigh-support moving portion 303, so that the thigh-support fixing portion connecting rod 311 moves forwards and backwards with the thigh-support moving portion connecting rod 312, and thus the synchronizing rod 313 moves forwards and backwards with the thigh-support fixing portion connecting rod 311 to extend and retract the seat cover.

For the thigh support 301 for the seat according to the embodiments of the present disclosure, the thigh-support driving portion 305 can drive the thigh-support moving portion 303 to move forwards and backwards relative to the thigh-support fixing portion 302, so as to realize the length adjustment of the seat cushion. Moreover, the thigh-support bracing portion 306 can effectively support the vacant region left by the thigh-support moving portion 303 after the thigh-support moving portion 303 moves forwards, so as to prevent the seat cover from collapsing, ensure the effective support of the seat to the driver, and guarantee the aesthetic appearance of the seat.

The sliding rail bracket 401 of the seat frame 101 according to embodiments of the present disclosure will be described below in detail with reference to FIGS. 24 and 25.

Figure 24:
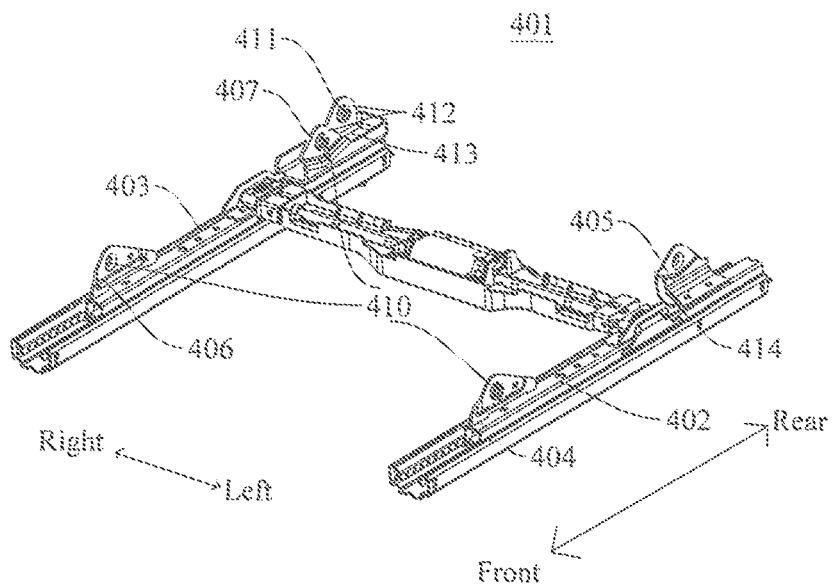
FIG. 24 is a schematic view of a sliding rail bracket for a seat.

As illustrated in FIG. 24, the sliding, rail of the seat includes a left sliding rail 402 and a right sliding rail 403; the vehicle body can be provided with a left fixed rail and a right fixed rail; the left sliding rail 402 can be slidably disposed in the left fixed rail, and the right sliding rail 403 can be slidably disposed in the right fixed rail.

As illustrated in FIG. 24, the sliding rail bracket 401 can include a first left front bracket 404, a first left rear bracket 405, a first right front bracket 406, and a first right rear bracket 407. The first left front bracket 404 and the first left rear bracket 405 are adapted to be secured on the left sliding rail 402, and are spaced apart from each other in the front-rear direction. The first right front bracket 406 and the first right rear bracket 407 are adapted to be secured on the right sliding rail 403, and are spaced apart from each other in the front-rear direction. At least one bracket is fixedly welded with the corresponding sliding rail. The first left front bracket 404 can be disposed at a front end of the left sliding rail 402, the first left rear bracket 405 can be disposed at a rear end of the left sliding rail 402, the first right front bracket 406 can be disposed at a front end of the right sliding rail 403, and the first right rear bracket 407 can be disposed at a rear end of the right sliding rail 403. By providing the above four brackets, the weight of the sliding rail bracket 401 can be reduced effectively, thereby enabling the sliding rail bracket 401 to satisfy the lightweight requirement of the vehicle. The connecting rods 123 can be pivotally mounted to the above four brackets correspondingly.

In some embodiments, each bracket can be fixedly welded with the corresponding sliding rail. Each bracket and sliding rail fixed by welding is fixed reliably, so that the structural reliability of the sliding rail bracket 401 can be ensured.

Figure 25:
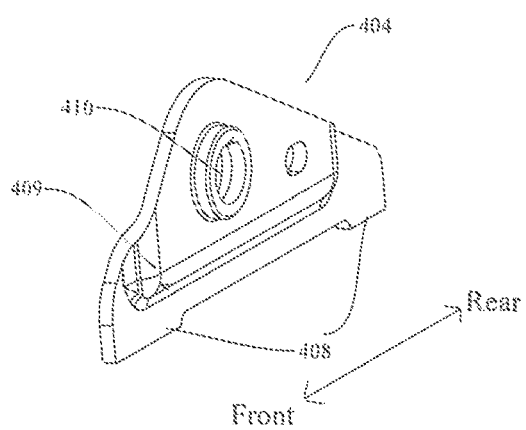
FIG. 25 is a schematic view of a first left front bracket in a sliding rail bracket for a seat.

According to one or more embodiments of the present disclosure, as illustrated in FIG. 25, each of the first left front bracket 404 and the first right front bracket 406 can be provided with a bracket protruding portion 408 extending downwards, and the bracket protruding portion 408 is fixedly welded with a corresponding sliding rail through laser welding. It could be understood that by providing the bracket protruding portion 408, a welding area between the bracket and the corresponding sliding rail can be decreased effectively to reduce the welding cost of the sliding rail bracket 401, and moreover, can ensure the welding strength between each bracket and the corresponding sliding rail.

In some embodiments, as illustrated in FIG. 25, two bracket protruding portions 408 can be provided, and arranged on respective bottom surfaces of the corresponding brackets and spaced apart in the front-rear direction. By providing the two bracket protruding portions 408 distributed in the front-rear direction, it is possible to guarantee the welding reliability between the bracket and the corresponding sliding rail in the front-rear direction. The bracket protruding portion 408 in the front may be located at a front end of the bracket, and the bracket protruding portion 408 in the rear may be located at a rear end of the bracket.

Additionally, as illustrated in FIG. 25, each of the first left front bracket 404 and the first right front bracket 406 is provided with a reinforcing structure 409. By providing the reinforcing structure 409, the structural strength of the first left front bracket 404 and the first right front bracket 406 can be enhanced effectively to prolong the service life of the sliding rail bracket 401 effectively.

Further, as illustrated in FIG. 25, the reinforcing structure 409 can be a reinforcing rib that extends along the front-rear direction, and a connecting rod connecting hole 410 is provided above each reinforcing rib. Thus, the reinforcing rib can effectively reinforce the structural strength of the first left front bracket 404 and the first right front bracket 406 in the front-rear direction.

In one or more embodiments, as illustrated in FIG. 24, one of the first left rear bracket 405 and the first right rear bracket 407 is provided with a safety belt fixing hole 411. Preferably the safety belt fixing hole 411 is provided in the first right rear bracket 407. Thus, a lower end of a safety belt can be mounted to the first right rear bracket 407, thereby simplifying the structure of the seat at least to a certain extent and reducing the number of parts of the seat.

Additionally, as illustrated in FIG. 24, the first right rear bracket 407 can include two vertical plates 412 arranged oppositely; in which one vertical plate 412 is provided with the connecting-rod connecting hole 410, while the other vertical plate 412 is provided with the safety belt fixing hole 411. The two vertical plates 412 are connected with each other through a connecting baseplate 413, and the connecting baseplate 413 and the right sliding rail 403 are is in face-to-face abutment. Through the face-to-face abutment between the connecting baseplate 413 and the right sliding rail 403, the reliability of the fitting between the first right rear bracket 407 and the right sliding rail 403 can be improved. The two vertical plates 412 are spaced apart in the left-right direction, and moreover, the safety belt fixing hole 411 and the connecting-rod connecting hole 410 are staggered in the front-rear direction, thereby avoiding mutual interference between the installation of the safety belt and the installation of the connecting rod, so as to arrange the sliding rail bracket 401 reasonably and improve the structural reliability of the seat.

Further, as illustrated in FIG. 24, the first left rear bracket 405 cart be L-shaped, and a connecting flanged edge 414 is provided between two limb plates of the L shape. A bottom surface of a short limb plate of the L-shaped first left rear bracket 405 is in face-to-face abutment with the left sliding rail 402, and the connecting flanged edge 414 is connected between front ends of the two limb plates, such that the connecting flanged edge 414 can effectively enhance the connecting strength of the two limb plates, so as to improve the structural strength of the first left rear bracket 405.

For the sliding rail bracket 401 for the seat according to the embodiments of the present disclosure, by providing each of the left sliding rail 402 and the right sliding rail 403 with two brackets spaced apart in the front-rear direction, the sliding rail bracket 401 can have the simple structure and light weight to satisfy the lightweight requirement of the vehicle. In addition, the sliding rail and the bracket connected by welding cart ensure the structural reliability of the sliding rail bracket 401.

The lumbar support 501 for the seat according to embodiments of the present disclosure will be described below in detail with reference to FIGS. 26-28.

The lumbar support 501 according to the embodiments of the present disclosure can include: a lumbar-support fixing portion 502 and a lumbar-support airbag 503 disposed to the lumbar-support fixing portion 502, in which the lumbar-support airbag 503 is configured to be inflated or deflated. It could be understood that by adjusting the inflated or deflated state of the lumbar-support airbag 503, the lumbar support 501 can support the lumbar region of the driver effectively, and match the back of the driver in shape, so as to relieve the driving fatigue of the driver effectively and improve the driving comfort thereof. An inflation power source of the lumbar-support airbag 503 may be disposed to the lumbar-support fixing portion 502. The inflation power source can be an air pump and an air and the air valve is connected to the lumbar-support airbag 503 through an air pipe. Optionally, the lumbar-support fixing portion 502 can be a flat plate structure. The lumbar support 501 can be mounted to the shoulder frame rotating portion 603 of the shoulder adjustment mechanism 601 through the lumbar-support mounting hole 604.

In some embodiments, a plurality of lumbar support airbags 503 can be provided, and any two adjacent lumbar-support airbags 503 are alternately inflated and deflated. It could be understood that by reasonable control over the inflated and deflated states of two adjacent lumbar-support airbags 503, the lumbar-support airbag 503 can massage the lumbar region of the driver effectively, thereby better relieving the driving fatigue of the driver and improving the driving comfort thereof.

Figure 26:
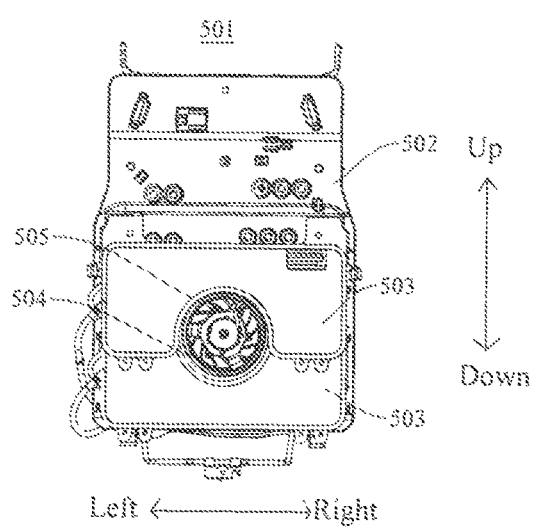
FIG. 26 is a front view of a lumbar support for a seat.
Figure 27:
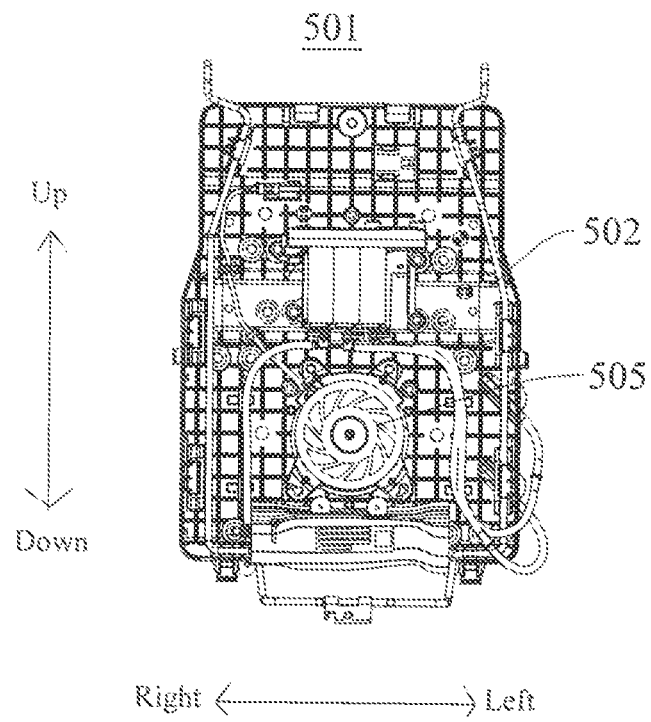
FIG. 27 is a rear view of a lumbar support for a seat.

According to one or more embodiments of the present disclosure, as illustrated in FIGS. 26 and 27, a middle portion of the lumbar-support airbag 503 is formed with a ventilation-device clearance hole 504. The lumbar support 501 can further include a ventilation device 505 secured to the lumbar-support fixing portion 502 and located at the ventilation-device clearance hole 504. Thus, by providing the ventilation device 505, the air can be caused to flow in a predetermined flow direction in the ventilation device 505, so that the driver can feel comfortable at his lumbar region, thereby relieving the driving fatigue of the driver and improving the driving comfort thereof.

Figure 28:
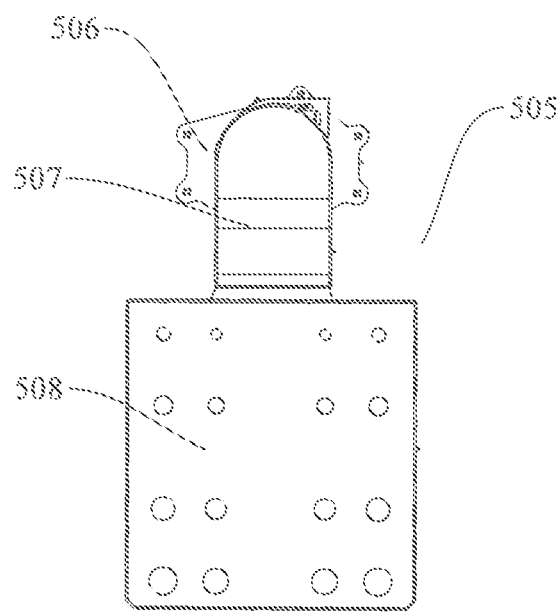
FIG. 28 is a schematic view of a ventilation device of a lumbar support for a seat.

In some embodiments, as illustrated in FIG. 28, the ventilation device 505 can include a fan 506, an air channel 507, and a ventilation sponge 508. The fan 506 can directly blow the air to the driver's lumbar region, and the air channel 507 and the ventilation sponge 508 can facilitate the flow of air within the ventilation device 505 and the driving cabin, such that the driver can feel cool or warm at his lumbar region, thereby relieving the driving fatigue of the driver and improving the driving comfort thereof. The ventilation sponge 508 is provided with a plurality of ventilation holes whose diameters are gradually increased from up to down.

Further, the lumbar support 501 can further include a temperature detection device configured to detect the temperature of the person sitting on the seat, and the temperature detection device is connected with the ventilation device 505. It could be understood that the temperature detection device can effectively detect a human body temperature of the driver; when the human body temperature is greater than a maximum value of a predetermined range set by the temperature detection device, the ventilation device 505 can deliver a cool breeze to the lumbar region of the driver; when the human body temperature is lower than a minimum value of the predetermined range set by the temperature detection device, the ventilation device 505 can deliver hot air to the lumbar region of the driver.

Additionally, the temperature detection device can be an infrared temperature sensor, and the infrared temperature sensor is provided to a top wall of the driving cabin or on a center control board. Alternatively, the temperature detection device is provided to the backrest of the seat. By properly setting the position of the infrared temperature sensor, the infrared temperature sensor can effectively detect the human body temperature of the driver.

In some embodiments, the ventilation device 505 can be associated with a refrigeration switch of an air conditioner of the vehicle. As a result, when the temperature in the driving, cabin is high and the driver or passenger turns on the refrigeration switch of the air conditioner, the ventilation device 505 can be turned on simultaneously, such that the ventilation device 505 can blow cold air generated by the air conditioner to the lumbar region of the driver, and hence the driver can feel cool at his lumbar region, thereby improving the driving comfort of the driver.

Additionally, the ventilation device 505 can be an air blowing device that blows air to the person sitting on the seat. The lumbar support 501 can further include a temperature regulation device that is disposed on an air supply path of the air blowing device. Thus, the temperature regulation device can regulate the air temperature on the air supply path, such that the driver can feel cool or warm correspondingly at his lumbar region, thereby improving the driving comfort of the driver.

Further, the temperature regulation device can be a semiconductor refrigeration device having a cold end and a hot end, the air supply path has a cold air path and a hot air path, and a path switching valve is provided between the cold air path and the hot air path and connected with the air blowing device. It could be understood that by switching the path switching valve, cold air delivery and hot air delivery can be switched, so that the air blowing device can deliver cold air or hot an to the driver's lumbar region, thereby improving the driving comfort of the driver.

In some embodiments, an air conditioning system of the vehicle has a seat air supply path, the seat air supply path has an air supply hose, the air supply hose is disposed on the floor of the vehicle, and the air supply hose extends upwards from a lower end of the seat into the interior of the seat. It could be understood that when the air conditioning system is started, the cold air or hot air generated by the air conditioning system can be delivered to the interior of the seat through the air supply hose, and the cold or hot air can pass through the seat to make the driver feel cool or warm.

According to one or more embodiments of the present disclosure, the ventilation device 505 can be secured to the lumbar-support fixing portion 502 and spaced apart from the lumbar-support airbag 503. By spacing the ventilation device 505 apart from the lumbar-support airbag 503, it is not necessary to modify the lumbar-support airbag 503, so that the structure of the lumbar support 501 can be reasonably arranged with small modifications, and the assembling efficiency of the lumbar support 501 can be improved.

For the lumbar support 501 for the seat according to the embodiments of the present disclosure, by providing the lumbar-support airbag 503, the lumbar-support airbag 503 can support the driver's lumbar region to enable the driver to feel comfortable at his lumbar region, so as to relieve the driving fatigue of the driver and improve the driving comfort thereof.

The seat according to one or more embodiments of the present disclosure is provided with the seat frame 101 of the above embodiments, and due to the seat frame 101 of the above embodiments, the seat can perform various functions, so as to improve the driving comfort of the driver, and the seat frame 101 has the simple structure and light weight to make the seat satisfy the lightweight requirement of the vehicle.

The vehicle according to the embodiments of the present disclosure is provided with the seat of the above embodiments, and due to the seat of the above embodiments, which can realize various functions and have light weight, the lightweight requirement of the vehicle can be satisfied.

The above merely involves preferred embodiments of the present disclosure, and is not intended to limit the present disclosure. Any modifications, equivalent substitutions, improvements, and the like without departing from the spirit and principle of the present disclosure, should be included in the protection scope of the present disclosure.

What is claimed is:

1. A thigh support for a seat, comprising:
   a thigh-support fixing portion;
   a thigh-support moving portion, a thigh-support guiding portion being provided between the thigh-support moving portion, and the thigh-support fixing portion, the thigh-support moving portion being able to move forwards and backwards relative to the thigh-support fixing portion under guidance of the thigh-support guiding portion, and the thigh-support moving portion having a forward limit position where it moves forwards to a limit position;
   a thigh-support driving portion configured to drive the thigh-support moving portion to move forwards and backwards; and
   a thigh-support bracing portion disposed to the thigh-support fixing portion and located at a rear side of the thigh-support moving portion, a part of the thigh-support bracing portion being flush with a rear edge of the thigh-support moving portion in the forward limit position, or a part of the thigh-support bracing portion being located in front of the rear edge of the thigh-support moving portion in the forward limit position,
   wherein the rear edge of the thigh-support moving portion is provided with a rear edge recessed portion recessed forwards, a front edge of the thigh-support bracing portion is formed with a front edge protruding portion protruding forwards, and the front edge protruding portion matches the rear edge recessed portion in shape.

2. The thigh support according to claim 1, wherein an upper surface of the thigh-support bracing portion is flush with an upper surface of the thigh-support moving portion.

3. The thigh support according to claim 1, wherein when the thigh-support moving portion is in an initial position, the front edge protruding portion is embedded in the rear edge recessed portion, and the front edge of the thigh-support bracing portion abuts the rear edge of the thigh-support moving portion; when the thigh-support moving portion is in the forward limit position, the rear edge of the thigh-support moving portion is spaced apart from the front edge of the thigh-support bracing portion in the front-rear direction, and the front edge of the front edge protruding portion is flush with or located in front of the rear edge of the thigh-support moving portion.

4. The thigh support according to claim 1, wherein the thigh-support bracing portion is configured as a support flat plate, and the front edge protruding portion is a trapezoidal plate integrally formed on a front edge of the support flat plate.

5. The thigh support according to claim 1, wherein the front edge protruding portion is located in a middle of the thigh-support bracing portion in a left-right direction.

6. The thigh support according to claim 1, wherein the thigh-support bracing portion is configured as a rollable retractable sheet having a fixed end and a moving end, the moving end of the retractable sheet is secured to the rear edge of the thigh-support moving portion, such that the thigh-support moving portion stretches the retractable sheet forwards by pulling the moving end of the retractable sheet when the thigh-support moving portion moves forwards.

7. The thigh support according to claim 6, further comprising an elastic thigh-support bracing portion that is adapted to be elastically supported at a bottom of the stretched retractable sheet.

8. The thigh support according to claim 1, wherein the thigh-support bracing portion is configured as a pleated plate having a plurality of pleated structures, the pleated plate has a fixed end and a moving end, and the moving end of the pleated plate is secured to the rear edge of the thigh-support moving portion, such that the thigh-support moving portion flattens the pleated plate by pulling the moving end of the pleated plate when the thigh-support moving portion moves forwards.

9. The thigh support according to claim 8, further comprising an elastic thigh-support bracing portion that is adapted to be elastically supported at a bottom of the flattened pleated plate.

10. The thigh support according to claim 1, further comprising two groups of thigh-support linkage structures spaced in a left-right direction, the thigh-support linkage structure comprising a thigh-support fixing portion connecting rod and a thigh-support moving portion connecting rod; an end of the thigh-support moving portion connecting rod is connected with the thigh-support moving portion, and the other end of the thigh-support moving portion connecting rod is pivotally connected with the thigh-support fixing portion connecting rod; an end of the thigh-support fixing portion connecting rod is pivotally connected with the thigh-support fixing portion, and a synchronizing rod is provided between the other end of the thigh-support fixing portion connecting rod in the left and the other end of the thigh-support fixing portion connecting rod in the right, wherein a lower end of the seat cover of the seat is secured to the synchronizing rod.

11. A seat, comprising:
a seat frame comprising:
a backrest frame comprising: an upper horizontal plate; a side panel disposed at each of left and right ends of the upper horizontal plate; and a lower horizontal plate connected between bottoms of two side panels;
a seat-cushion seat-basin assembly comprising: a seat cushion comprising seat-cushion side panels spaced apart in a left-right direction, a front linkage rod and a rear linkage rod being provided between two seat-cushion side panels and spaced apart in a front-rear direction, two ends of each linkage rod being provided with a connecting rod separately, and the connecting rod being adapted to be pivotally connected with a sliding rail; and a seat basin disposed at a front side of the seat cushion; and
at least one electrically actuated function module, disposed to the backrest frame or the seat-cushion seat-basin assembly, and comprising a shoulder adjustment mechanism, a backrest flank, a backrest-frame reclining mechanism, a seat-basin height-adjustment motor, a seat-basin flank, a seat-basin tilt adjustment motor, and a thigh support,
wherein the thigh support comprises:
a thigh-support fixing portion,
a thigh-support moving portion, a thigh-support guiding portion being provided between the thigh-support moving portion and the thigh-support fixing portion, the thigh-support moving portion being able to move forwards and backwards relative to the thigh-support fixing portion under guidance of the thigh-support guiding portion, and the thigh-support moving portion having a forward limit position where it moves forwards to a limit position,
a thigh-support driving portion configured to drive the thigh-support moving portion to move forwards and backwards, and
a thigh-support bracing portion disposed to the thigh-support fixing portion and located at a rear side of the thigh-support moving portion, a part of the thigh-support bracing portion being flush with a rear edge of the thigh-support moving portion in the forward limit position, or a part of the thigh-support bracing portion being located in front of the rear edge of the thigh-support moving portion in the forward limit position,
wherein the rear edge of the thigh-support moving portion is provided with a rear edge recessed portion recessed forwards, a front edge of the thigh-support bracing portion is formed with a front edge protruding portion protruding forwards, and the front edge protruding portion matches the rear edge recessed portion in shape.

12. The seat according to claim 11, wherein the side panel is provided with a side-panel upper recess and a side-panel lower recess that are spaced apart in an up-down direction, and the side-panel upper recess has a length smaller than a length of the side-panel lower recess.

13. The seat according to claim 12, wherein an upper end of the side-panel lower recess is close to an upper end of the side panel, while a lower end of the side-panel lower recess is close to a lower end of the side panel; a distance between a front edge of the side-panel lower recess and a front edge of the side panel is denoted as D1, a distance between a rear edge of the side-panel lower recess and a rear edge of the side panel is denoted as D2, and D1 and D2 satisfy: $10 \text{ mm} \leq D1 \leq 15 \text{ mm}$, and $10 \text{ mm} \leq D2 \leq 15 \text{ mm}$, respectively.

14. The seat according to claim 11, wherein the lower horizontal plate is located in front of and below the upper horizontal plate; the side panel is divided into a side-panel upper segment, a side-panel middle segment, and a side-panel lower segment; the side-panel upper segment is connected with the upper horizontal plate, the side-panel lower segment is connected with the lower horizontal plate, and the side-panel middle segment is connected between the side-panel upper segment and the side-panel lower segment in a forwardly curved manner; and a vertical height ratio of the side-panel upper segment, the side-panel middle segment and the side-panel lower segment is 1:4:2.

15. The seat according to claim 11, wherein the shoulder adjustment mechanism comprises:
a shoulder frame comprising a shoulder frame rotating portion, the shoulder frame rotating portion being pivotally mounted to the backrest frame of the seat and being provided with a lumbar-support mounting hole for mounting a lumbar support; and
a shoulder-frame electrical driving part configured to drive the shoulder frame to rotate around the shoulder frame rotating portion.

16. The seat according to claim 15, further comprising a driving-force balancing device disposed between the shoulder-frame electrical driving part and the shoulder frame, the driving-force balancing device having a plurality of driving-force balancing device connecting portions connected with the shoulder frame; and the driving-force balancing device comprising a shared connecting rod and a plurality of branch connecting rods, the shared connecting rod being connected with the shoulder-frame electrical driving part, and each branch connecting rod having a first end connected with the shared connecting rod and a second end connected with the shoulder frame.

17. The seat according to claim 16, further comprising a memory module and an identification module, the identification module being connected with the memory module and the shoulder-frame electrical driving part.

18. The seat according to claim 11, wherein the backrest flank comprises a left backrest flank and a right backrest flank, and each of the left backrest flank and the right backrest flank comprises:
a backrest flank fixing portion adapted to be secured to the backrest frame of the seat;
a backrest flank rotating portion rotatably mounted to the backrest flank fixing portion; and
a backrest flank airbag sandwiched between the backrest flank fixing portion and the backrest flank rotating portion and configured to be able to be inflated or deflated.

19. The seat according to claim 18, wherein the backrest flank airbag of the left backrest flank and the backrest flank airbag of the right backrest flank are configured to be inflated or deflated synchronously; or each backrest flank airbag is inflated and deflated alternately.

20. A vehicle, comprising a seat, the seat comprising:
a seat frame comprising:
- a backrest frame comprising: an upper horizontal plate; a side panel disposed at each of left and right ends of the upper horizontal plate; and a lower horizontal plate connected between bottoms of two side panels;
- a seat-cushion seat-basin assembly comprising: a seat cushion comprising seat-cushion side panels spaced apart in a left-right direction, a front linkage rod and a rear linkage rod being provided between two seat-cushion side panels and spaced apart in a front-rear direction, two ends of each linkage rod being provided with a connecting rod separately, and the connecting rod being adapted to be pivotally connected with a sliding rail; and a seat basin disposed at a front side of the seat cushion; and
- at least one electrically actuated function module, disposed to the backrest frame or the seat-cushion seat-basin assembly, and comprising a shoulder adjustment mechanism, a backrest flank, a backrest-frame reclining mechanism, a seat-basin height-adjustment motor, a seat-basin flank, a seat-basin tilt adjustment motor, and a thigh support, wherein the thigh support comprises:
- a thigh-support fixing portion,
- a thigh-support moving portion, a thigh-support guiding portion being provided between the thigh-support moving portion and the thigh-support fixing portion, the thigh-support moving portion being able to move forwards and backwards relative to the thigh-support fixing portion under guidance of the thigh-support guiding portion, and the thigh-support moving portion having a forward limit position where it moves forwards to a limit position,
- a thigh-support driving portion configured to drive the thigh-support moving portion to move forwards and backwards, and
- a thigh-support bracing portion disposed to the thigh-support fixing portion and located at a rear side of the thigh-support moving portion, a part of the thigh-support bracing portion being flush with a rear edge of the thigh-support moving portion in the forward limit position, or a part of the thigh-support bracing portion being located in front of the rear edge of the thigh support moving portion in the forward limit position, wherein the rear edge of the thigh-support moving portion is provided with a rear edge recessed portion recessed forwards, a front edge of the thigh-support bracing portion is formed with a front edge protruding portion protruding forwards, and the front edge protruding portion matches the rear edge recessed portion in shape.

* * * * *